United States Patent
Naito et al.

(10) Patent No.: US 8,337,962 B2
(45) Date of Patent: Dec. 25, 2012

(54) RESIN FILM AND METHOD FOR PRODUCING IT, POLARIZER AND LIQUID CRYSTAL DISPLAY DEVICE

(75) Inventors: Yu Naito, Minami-ashigara (JP); Nobutaka Fukagawa, Minami-ashigara (JP); Yoshio Ishii, Fujinomiya (JP); Jun Takeda, Minami-ashigara (JP); Akiko Watano, Minami-ashigara (JP); Masaki Noro, Minami-ashigara (JP); Masato Nagura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/046,397

(22) Filed: Mar. 11, 2011

(65) Prior Publication Data

US 2011/0223435 A1  Sep. 15, 2011

(30) Foreign Application Priority Data

| Mar. 12, 2010 | (JP) | 2010-055783 |
| Aug. 31, 2010 | (JP) | 2010-194665 |
| Mar. 1, 2011 | (JP) | 2011-044043 |

(51) Int. Cl.
*C09K 19/00* (2006.01)

(52) U.S. Cl. ........... 428/1.1; 428/342; 428/464; 349/96; 524/41; 106/168.01; 106/170.26

(58) Field of Classification Search ........... 428/1.1, 428/461, 464, 337, 339, 342; 106/170, 26, 106/168.01; 264/299, 213, 217; 349/96, 349/117; 524/41
See application file for complete search history.

(56) References Cited

U.S. PATENT DOCUMENTS

| 2009/0068487 A1* | 3/2009 | Kawai et al. ............ 428/516 |
| 2010/0055356 A1* | 3/2010 | Takeda et al. ............ 428/1.31 |
| 2011/0109849 A1* | 5/2011 | Yoo et al. ............ 349/96 |
| 2011/0193260 A1* | 8/2011 | Takeda et al. ............ 264/213 |

FOREIGN PATENT DOCUMENTS

| JP | 61-243837 A | 10/1986 |
| JP | 10-316791 A | 12/1998 |
| JP | 2002-179838 A | 6/2002 |
| JP | 2006-045497 A | 2/2006 |
| JP | 2006045497 A * | 2/2006 |
| JP | 2006-264028 A | 10/2006 |
| WO | WO2010002197 * | 1/2010 |

OTHER PUBLICATIONS

Machine translation of JP 2006045497A.*

* cited by examiner

*Primary Examiner* — Angela Ortiz
*Assistant Examiner* — Ruiyun Zhang
(74) *Attorney, Agent, or Firm* — Sughrue Mion, PLLC

(57) ABSTRACT

A resin film including a resin and an organic acid represented by the following formula (1), wherein the ratio of the organic acid to the resin is from 0.1 to 20% by mass:

$$X\text{-}L\text{-}(R^1)_n \qquad \text{Formula (1).}$$

25 Claims, 1 Drawing Sheet

RESIN FILM AND METHOD FOR PRODUCING IT, POLARIZER AND LIQUID CRYSTAL DISPLAY DEVICE

CROSS-REFERENCE TO RELATED APPLICATIONS

The present application claims the benefit of priority from Japanese Patent Application No. 055783/2010 filed on Mar. 12, 2010, Japanese Patent Application No. 194665/2010 filed on Aug. 31, 2010, and Japanese Patent Application No. 44043/2011 filed on Mar. 1, 2011, the contents of which are herein incorporated by reference in their entirety.

BACKGROUND OF THE INVENTION

1. Field of the Invention

The present invention relates to a resin film and to a method for producing a resin film. The present invention also relates to a polarizer and to a liquid crystal device produced by the use of the cellulose acetate film.

2. Description of the Related Art

Application to TVs of liquid-crystal display devices is expanding these days, and with the tendency toward big screen panels in the art, image quality enhancement and device cost reduction are being much desired. Further recently, outdoor use of liquid-crystal display devices has become much popular, and the devices are required to satisfy high-level durability in more extreme weather condition than that for the devices that have heretofore been produced under anticipation of indoor use thereof.

It is generally known that the durability of the polarizer in a liquid-crystal display device is enhanced by sandwiching a polarizing element formed by the use of polyvinyl alcohol (PVA) and iodine with polarizer protective films. As the polarizer protective films, various resin films are used such as typically cellulose acylate films, acrylic resin films, etc.; and they are required to be tough and have excellent optical properties. However, conventional polarizer protective films are not satisfactory in point of the polarizing element durability in outdoor severe environments, especially under high-temperature high-humidity condition.

On the other hand, in case where the resin film for use in polarizer protective films is produced according to a solution casting method, inexpensive resins for which the material cost is low must be used for satisfying the recent requirement for price reduction. Accordingly, it is desired to use inexpensive resins (for example, cellulose acylate having a low degree of substitution) heretofore not used in the art from the viewpoint that the releasability thereof from support in casting is poor and the surface condition of the film is therefore worsened in peeling and the optical properties thereof become ununiform, and to improve the releasability thereof to produce more inexpensive resin films.

JP-A 61-243837 describes a method of casting a cellulose acylate film solution that contains at least one release improver selected from (I) an organic phosphoric acid salt having an alkyl, alkenyl or aralkyl group having from 4 to 22 carbon atoms, (II) an organic sulfonic acid salt having an alkyl group having from 4 to 16 carbon atoms, in which the alkyl group links to the sulfonic acid group via an aryleneoxy group or an alkylene group, and (III) an organic polymer sulfonic acid salt having a sulfonic acid group in the recurring unit-having polymer side chain thereof. The patent reference says that use of the release improver satisfying the requirement makes it possible to reduce the release resistance of cellulose acylate having a degree of acetylation of from 56 to 62% (having a total degree of acyl substitution of from 2.5 to 2.95 or so). In Example in the Patent Reference, used are Compound 6 (sodium salt of organic phosphoric acid with two alkyl groups each having 12 carbon atoms linking to the phosphoric acid group therein), Compound 2 (sodium salt of organic sulfonic acid with two alkyl groups each having 9 carbon atoms linking the sulfonic acid group via the aryleneoxy group and the alkylene group therein), and Compound 3 (sodium salt of organic polymer sulfonic acid having a sulfonic acid group in the recurring unit-having polymer side chain thereof), as the release improver for cellulose acylate having a degree of acetylation of 61.9% (having a degree of total acylation of 2.9).

JP-A 2002-1798389 describes a method for casting a cellulose acylate film dope that contains an acid having an acid dissociation index in an aqueous solution of from 1.93 to 4.50 or its alkali metal salt or alkaline earth metal salt. The patent reference describes the use the organic acid or inorganic acid satisfying the requirement as a release agent. In Example in the patent reference, used are citric acid, tartaric acid, Compound 6 described in JP-A 61-243837 (sodium salt of organic phosphoric acid with an alkyl group having 12 carbon atoms and an alkyl group having 10 carbon atoms linking to the phosphoric acid group therein) and Compound 9 (potassium salt of organic sulfonic acid with an alkyl group having 16 carbon atoms linking to the sulfonic acid group via the aryleneoxy group and the alkylene group therein) as the release agent for cellulose acylate having a total degree of acyl substitution of from 2.7 to 3.0.

JP-A 10-316791 describes a polarizer protective film for which are used cellulose acetate flaks that contain an acid having an acid dissociation index in an aqueous solution of from 1.93 to 4.50. The patent reference describes use of such an organic acid or inorganic acid that satisfies the condition as a release agent. In Example in the patent reference, used are citric acid, citric acid salt and sodium acetate as a release agent and calcium acetate and magnesium acetate as a heat-resistant stabilizer for cellulose acylate having a degree of acetylation of from 55.2 to 61.3% (having a total degree of acyl substitution of from 2.5 to 2.9 or so).

SUMMARY OF THE INVENTION

The present invention has been made in consideration of the situation as above, and its object is to provide a resin film of which the releasability from the support in resin film production by solution casting is improved and which has the ability to enhance the polarizing element durability, and to provide a production method for the resin film for which the production yield is high and the production equipment maintenance cost is low. Another object of the invention is to provide a polarizer and a liquid-crystal display device comprising the film.

The present inventors have assiduously studied for the purpose of solving the above problems and, as a result, have found that, when an organic acid having a hydrophobic group with a specific structure in addition to the acid group moiety thereof is used as a release agent, then the film releasability from support in film production by solution casting is improved, and a resin film capable of enhancing the polarizing element durability can be thereby produced. In addition, the inventors have further found that when an organic acid having a hydrophobic group with a specific structure in addition to the acid group moiety thereof is used, then the film releasability from support is improved in production of a resin film capable of enhancing the polarizing element durability by solution casting, and moreover, the organic acid to be used solves the problem of equipment corrosion that is one serious problem in use of organic acid. Based on these findings, the inventors have reached an efficient method for production of resin film that attains a high product yield and can reduce the production equipment maintenance cost. Specifically, the above-mentioned objects can be attained by the following means.

[1] A resin film comprising a resin and an organic acid represented by the following formula (1), wherein the ratio of the organic acid to the resin is from 0.1 to 20% by mass:

$$X\text{-}L\text{-}(R^1)_n \qquad \text{Formula (1)}$$

wherein X represents an acid group wherein the acid dissociation constant is 5.5 or less; L represents a single bond, or a di- or more valent linking group; $R^1$ represents a hydrogen atom, an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; n represents 1 when L is a single bond, or represents the number expressed by:

(the valent number of L)−1 when L is a di- or more valent linking group.

[2] The resin film of [1], wherein X in the formula (1) represents a carboxyl group, a sulfonic acid group, a sulfinic acid group, a phosphate group, a sulfonimide group or an ascorbic acid group.

[3] The resin film of [1] or [2], wherein L in the formula (1) represents a single bond or a di- or more valent linking group selected from the following units, or a di- or more valent linking group formed by combining any of these units:

Unit: —O—, —CO—, —N(R²)— (where R² represents an alkyl group having from 1 to 5 carbon atoms), —CH(OH)—, —CH₂—, —CH═CH—, —SO₂—.

[4] The resin film of any one of [1] to [3], wherein the organic acid represented by the formula (1) is a carboxylic acid derivative represented by the following formula (2):

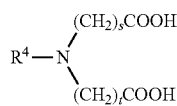

Formula (2)

wherein:
s and t each independently represent 1, 2 or 3;
$R^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a further substituent, with the proviso that $R^4$ include the moiety of $R^1$ in the formula (1) above.

[5] The resin film of any one of [1] to [4], wherein the organic acid represented by the formula (1) comprises a structure in which one molecule of a fatty acid and one molecule of a poly carboxylic acid are bonding to one molecule of a polyalcohol by ester bond, and the structure has at least one unsubstituted carboxyl group derived from the poly carboxylic acid.

[6] The resin film of any one of [1] to [5], wherein the resin comprises cellulose acylate by amount of from 5 to 99% by mass.

[7] The resin film of [6], wherein the total acyl substitution degree of the cellulose acylate is at least 1.0 and less than 2.6.

[8] The resin film of any one of [1] to [7], wherein the resin comprises acrylic resin in an amount of from 1 to 95% by mass.

[9] The resin film of any one of [1] to [8], wherein the concentration of the organic acid represented by the formula (1) in the area from the film surface to the 5 μm depth of one side of the film surface and the concentration of the organic acid represented by the formula (1) in the area from the film surface to the 5 μm depth of the other side of the film surface satisfy the following inequality (2):

1.2≦(the concentration of the organic acid in the area from the film surface to the 5 μm depth of the film surface with high concentration of the organic acid)/(the concentration of the organic acid in the area from the film surface to the 5 μm depth of the film surface with low concentration of the organic acid)≦5.0. Inequality (2)

[10] A method for producing a resin film comprising casting a dope having a resin and an organic acid represented by the following formula (1) on a metal support to prepare a dope film, wherein the ratio of the organic acid to the resin in the dope is from 0.1 to 20% by mass; and peeling away the dope film from the metal support:

$$X\text{-}L\text{-}(R^1)_n \qquad \text{Formula (1)}$$

wherein X represents an acid group wherein the acid dissociation constant is 5.5 or less; L represents a single bond, or a di- or more valent linking group; $R^1$ represents a hydrogen atom, an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; n represents 1 when L is a single bond, or represents the number expressed by:

(the valent number of L)−1 when L is a di- or more valent linking group.

[11] The method for producing a resin film of [10], wherein X in the formula (1) represents a carboxyl group, a sulfonic acid group, a sulfinic acid group, a phosphate group, a sulfonimide group or an ascorbic acid group.

[12] The method for producing a resin film of [10] or [11], wherein L in the formula (1) represents a single bond or a di- or more valent linking group selected from the following units, or a di- or more valent linking group formed by combining any of these units:

Unit: —O—, —CO—, —N(R²)— (where R² represents an alkyl group having from 1 to 5 carbon atoms), —CH(OH)—, —CH₂—, —CH═CH—, —SO₂—.

[13] The method for producing a resin film of any one of [10] to [12], wherein the organic acid represented by the formula (1) comprising a structure wherein one molecule of fatty acid and one molecule of poly carboxylic acid are bonding to one molecule of polyalcohol by ester bond, wherein the structure has at least one of unsubstituted carboxyl group derived from the poly carboxylic acid.

[14] The method for producing a resin film of any one of [10] to [13], wherein the resin comprises cellulose acylate by amount of from 5 to 99% by mass.

[15] The method for producing a resin film of [14], wherein the total acyl substitution degree of the cellulose acylate is at least 1.0 and less than 2.6.

[16] The method for producing a resin film of any one of [10] to [15], wherein the resin comprises acrylic resin by amount of from 1 to 95% by mass.

[17] The method for producing a resin film of any one of [10] to [16], comprising co-casting at least two layers of dope on the metal support, wherein the organic acid represented by the formula (1) is added to either one of a dope for the layer in contact with the metal support and a dope for the layer of air-solution interface.

[18] A resin film produced by the method for producing a resin film of any one of [10] to [17].

[19] A protective film of a polarizer comprising the resin film of any one of [1] to [9] and [18].

[20] A polarizer comprising at least one sheet of the protective film of [19].

[21] A liquid crystal display device comprising at least one sheet of the protective film [19] or at least one of the polarizer of [20].

According to the invention, the film releasability from a metal support in resin film production by solution casting is improved, and the invention provides a resin film capable of enhancing the polarizing element durability, and provides an efficient production method for producing the resin film that attains a high product yield and can reduce the production equipment maintenance cost. Further, according to the invention, there is provided a polarizer comprising the film and having high polarizing element durability. When the polarizer comprising the film is incorporated into a liquid-crystal display device, then the liquid-crystal display device may have improved durability under high-temperature high-humidity condition.

Figure 1:
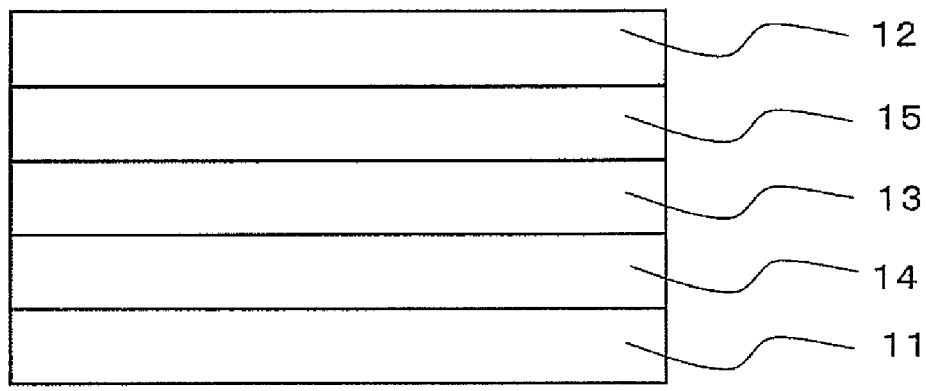
FIG. 1 is a schematic cross-sectional view showing one embodiment of a liquid crystal display device.

In the drawing, 1 donates dope for skin layer(s), 2 donates dope for core layer, 3 donates a co-casting Gieser, 4 donates a support, 11 and 12 donate polarizer(s), 13 donates a liquid crystal cell, 14 and 15 donate resin films of the Examples or Comparative Examples.

BEST MODE FOR CARRYING OUT THE INVENTION

Description winnow be made in detail of the resin film, and producing method for it of the present invention and additives for it. Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted. In the invention, "mass %" is equal to "weight %", and "% by mass" is equal to "% by'weight".

[Resin Film]

The resin film of the invention (which is also referred to as the film of the invention hereinafter) includes a resin and an organic acid represented by the following formula (1), wherein the ratio of the organic acid to the resin is from 0.1 to 20% by mass:

  Formula (1)

wherein X represents an acid group wherein the acid dissociation constant is 5.5 or less; L represents a single bond, or a di- or more valent linking group; $R^1$ represents a hydrogen atom, an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; n represents 1 in the case where L is a single bond, or represents the number expressed by:

(the valent number of L)−1 in the case where L is a di- or more valent linking group.

Hereinafter describes the invention concretely with referring to the preferably embodiments of the film of the invention.

<Resin>

Not specifically defined, the resin for use for the film of the invention may be any resin for known polarizer protective films. Above all, cellulose acylate or acrylic resin is preferred in the invention. According to the invention, the resin of which the releasability from a metal support is poor and which heretofore has not been used in the art even though expensive can be formed into a film by solution casting, and therefore use of inexpensive resin of cellulose acylate or acrylic resin is more preferred here.

The resin for use for the film of the invention is described below.

(Cellulose Acylate)

The starting material cellulose for the acylate includes cotton linter and wood pulp (broad-leaved tree pulp, coniferous tree pulp), etc.; and any cellulose acylate obtained from any starting material cellulose is employable herein. As the case may be, mixtures of cellulose acylates are also usable. The details of the starting material cellulose are described, for example, in Marusawa & Uda's "Plastic Materials Lecture (17), Cellulose Resins" by Nikkan Kogyo Shinbun (1970) and in Hatsumei Kyokai Disclosure Bulletin No. 2001-1745 (pp. 7 and 8).

One type alone or two or more different types of acyl groups may be in the film of the invention. Preferably, the film of the invention has an acyl group with from 2 to 4 carbon atoms as the substituent. In case where the film has two or more different types of acyl groups, one of them is preferably an acetyl group, and as the acyl group having from 2 to 4 carbon atoms, preferred is a propionyl group or a butyryl group. A dope of good solubility for the film can be produced, and especially in a chlorine-free organic solvent, a good dope can be produced. In addition, a dope having a low viscosity and having good filterability can be produced.

The cellulose acylate preferred for use in the invention is described in detail. The glucose units with β-1,4 bonding to each other to constitute cellulose have a free hydroxyl group at the 2-, 3- and 6-positions thereof. Cellulose acylate is a polymer derived from it through partial or complete esterification of those hydroxyl groups therein. The degree of acyl substitution as referred to herein means the total ratio of acylation of the 2-, 3- and 6-positioned hydroxyl groups in cellulose (100% acylation at each position is represented by a degree of substitution of 1).

The total degree of acyl substitution of the cellulose acylate is preferably from 1.0 to 2.97, more preferably from 1.0 to less than 2.6, even more preferably from 1.5 to 2.6. Cellulose acylate having a low degree of substitution has excellent optical properties though inexpensive, but has not been used so much in film formation according to a conventional solution casting method since the formed film is poorly releasable from metal support. In the invention, such inexpensive cellulose acylate is especially favorably used.

The acyl group having 2 or more carbon atoms in the cellulose used in the invention may be an aliphatic group or an aryl group, and are not particularly limited. They may be an alkylcarbonyl ester of cellulose, an alkenylcarbonyl ester of cellulose, an aromatic carbonyl ester of cellulose or an aromatic alkylcarbonyl ester of cellulose. These esters may have a substituent. Preferable examples of the substituents include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. An acetyl group, a propionyl group, a butanoyl group, a dodecanoyl group, an octadecanoyl group, a tert-butanoyl group, an oleoyl group, a benzoyl group, a naphthylcarbonyl group and a cinnamoyl group are more preferred, and an acetyl group, a propionyl group and a butanoyl group (in case where the acyl group has from 2 to carbon atoms) are particularly preferred, and the most preferred is an acetyl group (in case where the cellulose acylate is a cellulose acetate).

In acylation of cellulose, when an acid anhydride or an acid chloride is used as the acylating agent, the organic solvent as the reaction solvent may be an organic acid, such as acetic acid, or methylene chloride or the like.

When the acylating agent is an acid anhydride, the catalyst is preferably a protic catalyst such as sulfuric acid; and when the acylating agent is an acid chloride (e.g., CH3CH2COCl), a basic compound may be used as the catalyst.

A most popular industrial production method for a mixed fatty acid ester of cellulose comprises acylating cellulose with a fatty acid corresponding to an acetyl group and other acyl groups (e.g., acetic acid, propionic acid, valeric acid, etc.), or with a mixed organic acid ingredient containing their acid anhydride.

The cellulose acylate for use in the invention can be produced, for example, according to the method described in JP-A 10-45804.

The film of the invention preferably includes cellulose acylate as the resin by amount of from 5 to 99% by mass from the viewpoint of water vapor transmission rate, more preferably 20 to 99% by mass, particularly preferably 50 to 95% by mass.

(Acrylic Resin)

As the acrylic resin for use in the invention, the acrylic resin described in WO2009/084295 can be used. In these, the acrylic resin described in from [0067] to [0075] in WO2009/084295 is preferably used.

The film of the invention preferably includes acrylic resin as the resin by amount of from 1 to 95% by mass from the viewpoint of water vapor transmission rate, more preferably 20 to 90% by mass, particularly preferably 30 to 80% by mass.

It is also preferable that the film of the invention includes both cellulose acylate and acrylic resin. In case where the film of the invention includes both cellulose acylate and acrylic resin, preferable embodiments are as follows.

In the film of the invention, acrylic resin and the cellulose acylate resin is preferably included in the film at the ratio of 95/5 to 5/95 by mass, further preferably at the ratio of 90/10 to 10/90 by mass, most preferably at the ratio of 80/20 to 20/80 by mass.

<Release Promoter>

(Organic Acid Represented by Formula (1))

The film of the invention includes the organic acid represented by formula (1) as a release promoter.

$$X\text{-}L\text{-}(R^1)_n \qquad \text{Formula (1)}$$

wherein X represents an acid group wherein the acid dissociation constant is 5.5 or less; L represents a single bond, or a di- or more valent linking group; $R^1$ represents a hydrogen atom, an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; n represents 1 in the case where L is a single bond, or represents the number expressed by:

(the valent number of L)−1 in the case where L is a di- or more valent linking group.

In the organic acid represented by the above formula (1), the acid group moiety of the X part acts to enhance the releasability of the formed film from the solution casting apparatus (metal support for dope casting thereon). Reduction of the releasability would be caused by the mechanism that the surface of a metal support (for example stainless) used for casting have an interaction (for example hydrogen bond) with the polar moiety (for example a hydroxyl group) in a cellulose contained in a dope directly or indirectly through components contained in the dope (for example a compound having an acid group or impurities) to increase the adhesiveness between the metal support and the dope. The polycarboxylic acid represented by the formula (1) would have a function to reduce or prevent the interaction under the mechanism.

Specifically, the X part of the acid group moiety adheres to the metal surface of the support, and the $R^1$ part of the hydrophobic group moiety having a specific structure protects the metal surface of the support from an oxidizing agent such as oxygen or the like, and therefore, as compared with an organic acid in which the hydrophilic group does not fall in the range of the above $R^1$, the organic acid for use in the invention is more effective for preventing metal corrosion.

Hereinafter describes the release promoter preferably used in the film of the invention.

In the formula (1), X represents an acid group wherein the acid dissociation constant is 5.5 or less, X is preferably a carboxyl group, a sulfonic acid group, a sulfinic acid group, a phosphate group, a sulfonimide group or an ascorbic acid group, further preferably a carboxyl group or a sulfonic acid group, most preferably a carboxyl group. In case where X represents an ascorbic acid group, 5 and 6-position hydrogen atoms of the ascorbic acid group preferably dissociate to bond to L.

In this description, the data given in "Handbook of Chemistry" published by Maruzen may be employed for the acid dissociation constant.

In the formula (1), $R^1$ represents a hydrogen atom, an alkyl group having from 6 to 30 carbon atoms (which may have a substituent and may be a cycloalkyl group), an alkenyl group having from 6 to 30 carbon atoms (which may have a substituent), an alkynyl group having from 6 to 30 carbon atoms (which may have a substituent), an aryl group having from 6 to 30 carbon atoms (which may have a substituent) or a from 6 to 30 membered heterocyclic group (which may have a substituent). Example of the substituent includes a halogen atom, an alkyl group (which preferably has from 1 to 10 carbon atoms, more preferably from 1 to 6 carbon atoms)an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acyl amino group, an oxycarbonyl group, a carbamoyl group, a sulfonyl group, a sulfamoyl group, a sulfonamide group, a sulfolyl group, a carboxyl group, etc.

$R^1$ is preferably an aryl group having from 6 to 24 carbon atoms, a from 6 to 24 membered heterocyclic group, an alkyl group having from 8 to 24 carbon atoms, an alkenyl group having from 8 to 24 carbon atoms or an alkynyl group having from 8 to 24 carbon atoms, most preferably an aryl group having from 6 to 20 carbon atoms, a from 6 to 20 membered heterocyclic group, a straight chain alkyl group having from 10 to 24 carbon atoms or a straight chain alkenyl group having from 10 to 24 carbon atoms.

L in the formula (1) preferably represents a single bond or a di- or more valent linking group selected from the following units, or a di- or more valent linking group formed by combining any of these units:

Unit: —O—, —CO—, —N($R^2$)— (where $R^2$ represents an alkyl group having from 1 to 5 carbon atoms), —CH(OH)—, —CH$_2$—, —CH=CH—, —SO$_2$—.

L in formula (1) is preferably a single bond or has an ester group-derived linking group (—COO—, —OCO—) or an amide group-derived linking group (—CON($R^2$)—, —N($R^2$)CO—) as the partial structure thereof.

L may further have a substituent; and not specifically defined, the substituent may be any one selected from those described above for the substituent that $R^1$ may have. Of those, preferred are —OH and an alkyl group (more preferably an alkyl group substituted with a carboxylic acid).

$R^2$ may have a substituent. The substituent is not specifically limited. Examples of the substituent include the above examples of the substituent which $R^1$ may have. Of those, preferred is a carboxyl group.

L is more preferably a linking group comprising a group derived from glycerin or a group derived from iminodicarboxylic acid (—N(CH$_2$COOH)(CH$_2$COOH)).

Preferably, L concretely has the following structure. In the following, p, q and r each indicate an integer of from 1 to 40, preferably from 1 to 20, more preferably from 1 to 10, even more preferably from 1 to 6. More particularly preferably, q indicates an integer of from 2 to 4.

L1: —(CH$_2$)$_p$—CO—O—(CH$_2$)$_q$—O—;
L2: —(CH$_2$)$_p$—CO—O—(CH$_2$)$_q$—(CH(OH))—(CH$_2$)$_r$—O—;
L3: —(CH$_2$)$_p$—CO—O—(CH$_2$)$_q$—(CH(OCO—$R^3$))—(CH$_2$)$_r$—O—;
L4: —(CH$_2$)$_p$—CO—O—(CH$_2$)$_q$—(CH(OH))—(CH$_2$)$_r$—O—CO—;
L5: —(CH$_2$)$_p$—CO—O—(CH$_2$)$_q$—(CH(OCO—$R^3$))—(CH$_2$)$_r$—O—CO—;
L6: —(CH$_2$)$_p$-n(CH$_2$COOH)—;
L7: —(CH$_2$)$_p$—N(CH$_2$COOH)—(CH$_2$)$_q$—;
L8: —(CH$_2$)$_p$—N(CH$_2$COOH)—(CH$_2$)$_q$—O—;
L9: —(CH$_2$)$_p$—N(CH$_2$COOH)—(CH$_2$)$_q$—CONH—;
L10: —(CH$_2$)$_p$—N(CH$_2$COOH)—(CH$_2$)$_q$—CONH—(CH$_2$)$_r$—;
L11: —(CH$_2$)$_p$—N(CH$_2$COOH)—CO—;
L12: —(CH$_2$)$_p$—N(CH$_2$COOH)—CO—CH(CH$_2$COOH)—;
L13: —(CH$_2$)$_p$—N(CH$_2$COOH)—SO$_2$—.

$R^3$ in the specific examples of L has the same meaning as that of $R^1$ in the above formula (1). Specifically, $R^3$ in the liking group of —(CH$_2$)$_p$—CO—O—(CH$_2$)$_q$—(CH(OCO—$R^3$))—(CH$_2$)$_r$—O— is described inside L for convenience sake, but the linking group L means the part from which $R^3$ is removed. Accordingly, in this case, L is trivalent. This may be expressed as the formula (1), X-L-($R^1$)$_2$ (wherein L is —(CH$_2$)$_p$—CO—O—(CH$_2$)$_q$—(CH(OCO—))—(CH$_2$)$_r$—O—), and in this case, the linking group L is a trivalent linking group.

Preferably, L and X bonds to each other via an ester bond or an amide bond, more preferably via an ester bond. Preferably, X does not have an ester bond or an amide bond therein.

Preferably, L and $R^1$ bonds to each other via an ester bond, an ether bond or an amide bond, more preferably an ester bond or an amide bond, even more preferably an ester bond. Preferably, $R^1$ does not have an ester bond, an ether bond or an amide bond therein.

Preferred examples of the organic acid of formula (1) for use in the invention are given below.

<<Fatty Acid>>
Myristic acid, palmitic acid, stearic acid, oleic acid, linolic acid, linolenic acid, recinoleic acid, undecanoic acid.

<<Alkylsulfuric Acid>>
Myristylsulfuric acid, cetylsulfuric acid, oleylsulfuric acid.

<<Alkylbenzenesulfonic Acid>>
Dodecylbenzenesulfonic acid, pentadecylbenzenesulfonic acid.

<<Alkylnaphthalenesulfonic Acid>>
Sesquibutylnaphthalenesulfonic acid, diisobutylnaphthalenesulfonic acid.

<<Dialkylsulfosuccinic Acid>>
Dioctylsulfosuccinic acid, dihexylsulfosuccinic acid, dicyclohexylsulfosuccinic acid, diamylsulfosuccinic acid, ditridecylsulfosuccinic acid.

<<Polycarboxylic Acid Represented by Formula (2)>>
The organic acid represented by the formula (1) is preferably a polycarboxylic acid represented by the following formula (2):

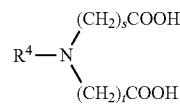

Formula (2)

In the formula, s and t each independently represent 1, 2 or 3. $R^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a further substituent, with the proviso that $R^4$ include the moiety of $R^1$ in the formula (1) above.

Preferably, s and t each independently represent 1 or 2 more preferably 1.

$R^4$ preferably represents an alkyl group having from 1 to 30 carbon atoms (which may have a substituent and may be a cycloalkyl group), an arylsulfonyl group having from 6 to 30 carbon atoms (which may have a substituent), an acyl group (which may have a substituent). More preferably, $R^4$ represents an alkyl group having from 1 to 30 carbon atoms (which may have a substituent), still more preferably an alkyl group having from 1 to 24 carbon atoms (which may have a substituent), particularly preferably an alkyl group having from 1 to 20 carbon atoms.

Example of the substituent for $R^4$ includes an alkyl group, a halogen atom, an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acyl amino group, an oxycarbonyl group, a carbamoyl group, a sulfonyl group, a sulfamoyl group, a sulfonamide group, and a carboxyl group; preferably an alkyl group, an acyl group, an aryl group and a carbamoyl group; more preferably an aryl group and a carbamoyl group.

The substituent of $R^4$ may further have a substituent. Preferably range of the substituent is the same as the preferably range of the substituent of $R^4$.

Most preferably, $R^4$ is an alkyl group having from 1 to 24 carbon atoms having an aryl group as a substituent, or an alkyl group having from 1 to 24 carbon atoms having a carbamoyl group as a substituent in which the carbamoyl group is preferably substituted by an aryl group. The aryl group is preferably substituted by an alkyl group having from 1 to 10 carbon atoms, more preferably from 1 to 8 carbon atoms.

Examples of the carboxylic acid derivatives represented by Formula (3) include:
N-(2,6-diethylphenylcarbomoylmethyl)iminodiacetic acid represented by the following Formula (3):

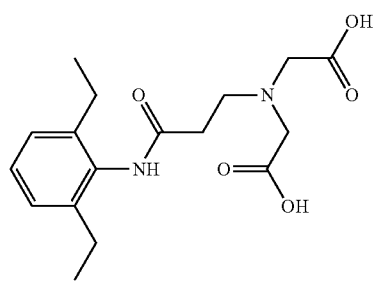

(3)

N-benzyliminodiacetic acid represented by the following Formula (4):

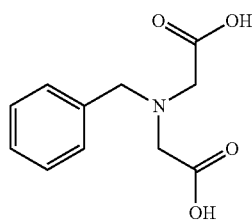

(4)

a compound represented by any one of the following Formulae (5) to (12):

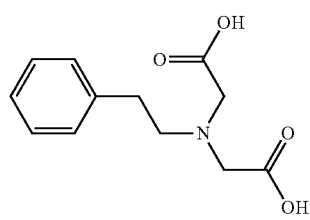

(5)

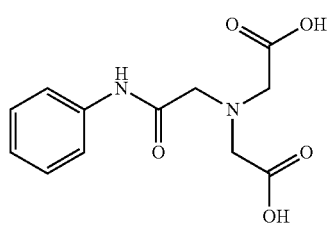

(6)

-continued

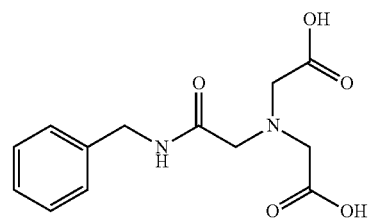

(7)

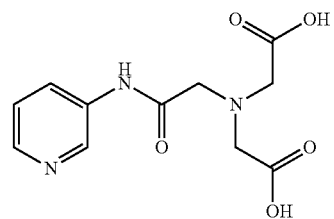

(8)

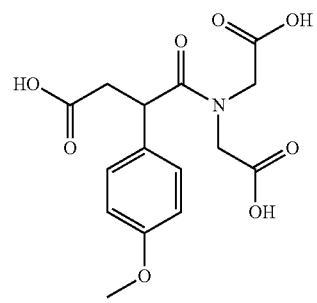

(9)

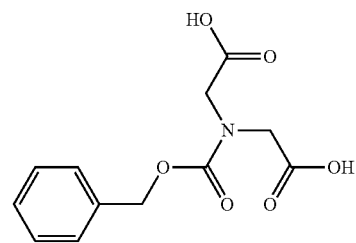

(10)

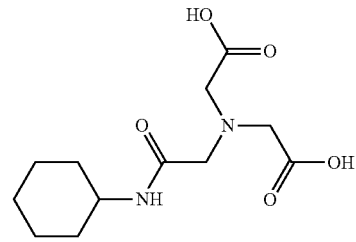

(11)

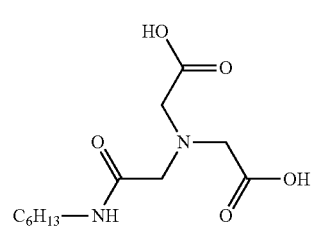

(12)

lauraminodiacetic acid represented by the following Formula (13):

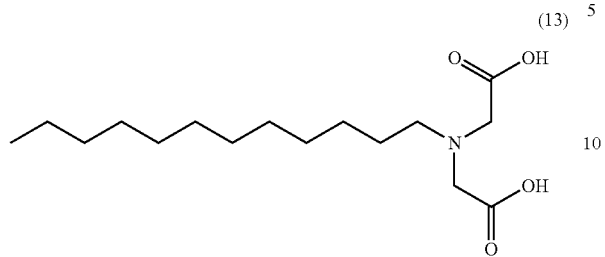

a compound represented by any one of the following Formulae (14) to (22):

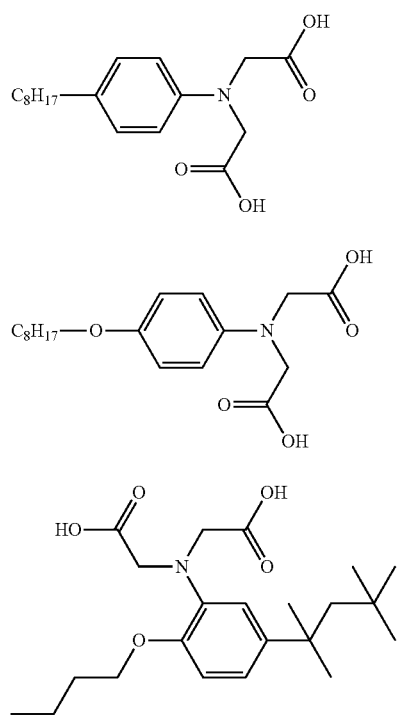

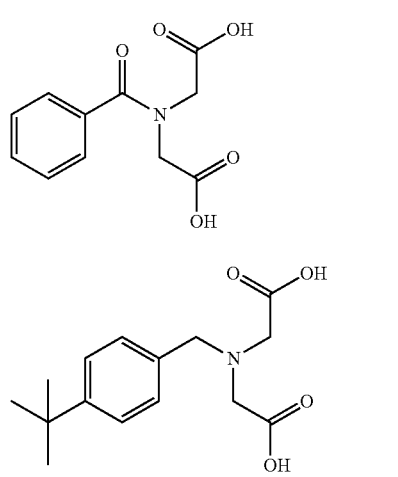

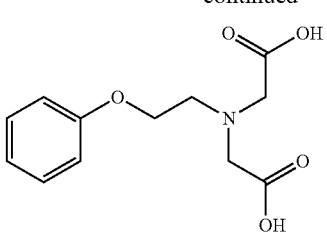

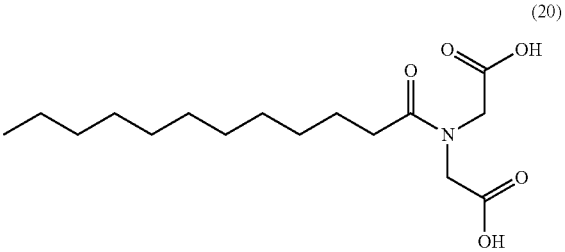

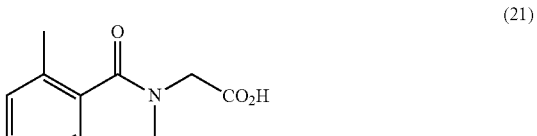

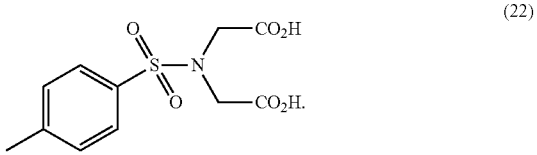

<<Polycarboxylic Acid, and Partial Derivative of Polycarboxylic Acid>>

The organic acid of the formula (1) is preferably a partial derivative of a polycarboxylic acid. In this description, the partial derivative of a polycarboxylic acid has a structure where one molecule of a fatty acid and a polycarboxylic acid are ester-bonded to one molecule of a polyalcohol, and is a compound having at lest one unsubstituted acid group derived from a polycarboxylic acid. In this description, the fatty acid means an aliphatic monocarboxylic acid. Specifically, the fatty acid in this description is not limited to a so-called higher fatty acid but includes a lower fatty acid having at most 12 carbon atoms such as acetic acid, propionic acid, etc.

The partial derivative of a polycarboxylic acid is preferably a partial derivative of a polycarboxylic acid. Above all, the organic acid of formula (1) comprises a structure wherein one molecule of fatty acid and one molecule of poly carboxylic acid are bonding to one molecule of polyalcohol by ester bond, wherein the structure has at least one of unsubstituted carboxyl group derived from the poly carboxylic acid. The polycarboxylic acid for the partial derivative of a polycarboxylic acid is not specifically defined, for which, for example, preferred are succinic acid, citric acid, tartaric acid, diacetyltartaric acid, malic acid, adipic acid.

The polyalcohol for the partial derivative of a polycarboxylic acid includes adonitol, arabitol, ethylene glycol, diethylene glycol, triethylene glycol, tetraethylene glycol, 1,2-propanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, glycerin, etc. In those, preferred are glycerin and so it is preferably that the organic acid represented by formula (1) is a so-called organic acid monoglyceride.

The organic acid of formula (1) for use in the invention is preferably an organic acid glyceride (glycerin fatty acid organic acid ester) in which the acid group X of the organic acid bonds to the hydrophobic moiety $R^1$ via the linking group L containing a glycerin-derived group. The organic acid glyceride in this description is a compound having a structure in which one or two of the three hydroxyl groups of glycerin form an ester bond with a fatty acid and the remaining one or two hydroxyl groups form an ester bond with a polycarboxylic acid and which has an acid group derived from the polycarboxylic acid.

Above all, more preferred is an organic acid monoglyceride or an organic acid diglyceride, and even more preferred is an organic acid monoglyceride. The organic acid monoglyceride in this description is a compound having a structure in which one of the three hydroxyl groups of glycerin forms an ester bond with a fatty acid and the remaining one or two hydroxyl groups form an ester bond with a polycarboxylic acid and which has an acid group derived from the polycarboxylic acid. The organic acid diglyceride in this description is a compound having a structure in which two of the three hydroxyl groups of glycerin form an ester bond with a fatty acid and the remaining one hydroxyl group forms an ester bond with a polycarboxylic acid and which has an acid group derived from the polycarboxylic acid.

Of the organic monoglyceride, more preferred is one having a structure in which one of the three hydroxyl groups of glycerin forms an ester bond with a fatty acid and the remaining one hydroxyl group is an unsubstituted hydroxyl group and the last one hydroxyl group forms an ester bond with a polycarboxylic acid and which has an acid group derived from the polycarboxylic acid. Preferably, the hydroxyl group ester-bonding to the fatty acid in the organic acid monoglyceride is in an asymmetric position (so-called α-monoglyceride position), and the hydroxyl group ester-bonding to the polyorganic acid in the organic acid monoglyceride is similarly in an asymmetric position (so-called α-monoglyceride position). Specifically, of the above-mentioned organic monoglyceride, preferred is one having a structure which has an unsubstituted hydroxyl group and in which the carbon atom directly bonding to the hydroxyl group that ester-bonds to the fatty acid and the carbon atom directly bonding to the hydroxyl group that ester-bonds to the polycarboxylic acid do not lie next to each other.

Of the above-mentioned organic monoglyceride, especially preferred is a polycarboxylic acid monoglyceride. The polycarboxylic acid monoglyceride has at least one unsubstituted carboxyl group of the polycarboxylic acid moiety and the other carboxyl groups are substituted with a monoglyceride. More preferred is a carboxyl group-having organic acid monoglyceride in which one fatty acid molecule and one polyvalent carboxylic acid molecule bond to one glycerin molecule.

The polycarboxylic acid for the monoglyceride of a polycarboxylic acid is not specifically defined, for which, for example, preferred are succinic acid, citric acid, tartaric acid, diacetyltartaric acid, malic acid, adipic acid.

The fatty acid for the monoglyceride of a polycarboxylic acid is not specifically defined, for which is preferred a saturated or unsaturated fatty acid having from 8 to 22 carbon atoms. Concretely mentioned are caprylic acid, capric acid, lauric acid, myristic acid, palmitic acid, stearic acid, behenic acid, oleic acid, etc.

The carboxyl group-having organic acid monoglyceride for use in the production method of the invention is described in detail hereinafter.

The carboxyl group-having organic acid monoglyceride usable in the invention may be obtained by reacting a polyorganic acid anhydride and a fatty acid monoglyceride generally according to the method described in JP-A 4-218597 and Japanese Patent No. 3823524.

The reaction is attained generally in the absence of a solvent, and for example, the reaction of succinic acid and a fatty acid monoglyceride having 18 carbon atoms may be attained at a temperature of around 120° C. and may be completed within about 90 minutes. Thus obtained, the organic acid monoglyceride is generally a mixture containing an organic acid, unreacted monoglyceride and diglyceride and other oligomers. In the invention, the mixture may be used directly as it is.

For increasing the purity of the carboxyl group-having organic acid monoglyceride, the carboxyl group-having organic acid monoglyceride may be isolated from the mixture through distillation or the like. The carboxyl group-having organic acid monoglyceride having a high purity is commercially available as a distilled monoglyceride, which may be used in the invention. Commercial products of the carboxyl group-having organic acid monoglyceride include, for example, Riken Vitamin's Poem K-37V (citric and oleic acid esters of glycerol), Kao's Step SS (succinic acid monoglyceride in which stearic acid/palmitic acid monoglyceride bonds to succinic acid), etc.

The amount of the organic acid of formula (1) to be in the film of the invention is in a ratio of from 0.1% by mass to 20% by mass relative to the resin, preferably from 0.5% by mass to 10% by mass, more preferably from 0.6% by mass to 5% by mass, even more preferably from 1.5% by mass to 5% by mass.

When the amount is at least 0.1% by mass, then the polarizing element durability improving effect and the releasability improving effect of the resin film are satisfactory. When the amount is at most 20% by mass, then it is favorable since the organic acid hardly bleeds out when aged in high-temperature and high-humidity condition and since the vertical transmittance of the polarizer that comprises the film hardly increases.

The concentration of the organic acid of formula (1) to be in the film of the invention is preferably from 0.2 to 40 mmol per 100 g of the film, more preferably from 0.5 to 5 mmol, even more preferably from 0.6 to 4.5 mmol, still more preferably from 0.8 to 4.0 mmol.

In the film of the invention, the distribution of the organic acid is not restricted.

In the film of the invention, the concentration of the organic acid represented by the formula (1) in the area from the film surface to the 5 μm depth of one side of the film surface and the concentration of the organic acid represented by the formula (1) in the area from the film surface to the 5 μm depth of the other side of the film surface preferably satisfy the following inequality (2) from the viewpoint of improving the reduction of the molecule weight of the resin:

1.2≦(the concentration of the organic acid in the area from the film surface to the 5 μm depth of the film surface with high concentration of the organic acid)/(the concentration of the organic acid in the area from the film surface to the 5 μm depth of the film surface with low concentration of the organic acid)≦5.0.  Inequality (2)

The lower limit of the inequality (2) is more preferably 1.5, particularly preferably 2.0. The upper limit of the inequality (2) is more preferably 4.5, particularly preferably 4.0.

(Other Release Promoter)

In addition to the organic acid of the formula (1), a known release promoter may be added to the film of the invention. As the known release promoter, the compounds described in JP-A 2006-45497, [0048] to [0069] may be preferably used herein. These compounds and other examples of the release promoter preferably used in the producing method of the invention are explained hereinafter.

The release promoter is preferably an organic acid, a polycarboxylate ester, a surfactant or a chelating agent.

As the polycarboxylate ester, preferred are the compounds described in JP-A 2006-45497, paragraph [0049].

As the surfactant, preferred are the compounds described in JP-A 2006-45497, paragraphs [0050] to [0051].

The chelating agent is a compound capable of being chelated with a polyvalent ion such as an iron ion or the like metal ion or a calcium ion or the like alkaline earth metal ion. As the chelating agent, usable here are the compounds described in JP-B 6-8956 and JP-A 11-190892.

The total content of the release promoter in the film of the invention is preferably in an amount of from 0.001% by mass (10 ppm) to 20% by mass (200000 ppm), more preferably in an amount of from 0.005% by mass (50 ppm) to 15% by mass (150000 ppm), particularly preferably in an amount of from 0.01% by mass (100 ppm) to 10% by mass (100000 ppm), more particularly preferably in an amount of from 0.03% by mass (300 ppm) to 10% by mass (100000 ppm), further more particularly preferably in an amount of from 0.1% by mass (1000 ppm) to 5% by mass (50000 ppm), relative to the amount of the resin contained in the film of the invention.

<Other Additive>

The film of the invention may contain various additives other than the release promoter such as polycondensed polymer, retardation controlling agent (retardation enhancer and retardation depressor), plasticizer such as phthalate or phosphate compound, UV absorbent, antioxidant, mat agent, etc.

(Polycondensed Polymer)

The film of the invention preferably contains a polycondensed polymer from the viewpoint of reducing the haze of the film.

As the polycondensed polymer, widely employable herein are high molecular agent known as additives for cellulose acylate films. The content of the high molecular agent in the film of the invention is preferably in an amount of from 1 to 35% by mass, more preferably more preferably in an amount of from 4 to 30% by mass, particularly preferably in an amount of from 10 to 25% by mass, relative to the amount of the resin contained in the film of the invention.

The high molecular weight additive for use in the film of the invention as the polycondensed polymer is a compound having repetitive units therein, preferably having a number-average molecular weight of from 700 to 100000. The high molecular weight additive serves to promote the solvent vaporization speed and to reduce the residual solvent amount in a solution casting process. Further, the high molecular weight additive added to the film of the invention is effective from the viewpoint of reforming the film of, for example, enhancing the mechanical properties of the film, imparting flexibility and water absorption resistance to the film and reducing the moisture permeability of the film.

The high molecular weight additive for use in the invention as the polycondensed polymer more preferably has a number-average molecular weight from 700 to 8000, further preferably from 700 to 5000, particularly preferably 1000 to 5000.

Description will be made in detail of the high molecular weight additives used in the invention as the polycondensed polymer with reference to the specific examples. However, the high molecular weight additives used in the invention as the polycondensed polymer are not limited thereto.

Preferably, the polycondensed polymer is preferably a non-phosphate ester compound. In this description, the "non-phosphate ester compound" means "a compound that is an ester not containing phosphoric acid.

The polymer additive of the polycondensed polymer includes polyester polymers (aliphatic polyester polymers, aromatic polyester polymers, etc.), and copolymers of a polyester ingredient and any other ingredient. Preferred are aliphatic polyester polymers, aromatic polyester polymers, copolymers of a polyester polymer (aliphatic polyester polymer, aromatic polyester polymer, etc.) and an acrylic polymer, and copolymers of a polyester polymer (aliphatic polyester polymer, aromatic polyester polymer, etc.) and a styrenic polymer; and more preferred are polyester compounds having an aromatic ring moiety as at least one copolymerization ingredient.

The aliphatic polyester-type polymers is one produced by reaction of a mixture of an aliphatic dicarboxylic acid having from 2 to 20 carbon atoms, and a diol selected from the group consisting of aliphatic diols having from 2 to 12 carbon atoms and alkyl ether diols having from 4 to 20 carbon atoms. Both ends of the reaction product may be as such, or may be blocked by further reaction with monocarboxylic acids, monoalcohols or phenols. The terminal blocking may be effected for the reason that the absence of a free carboxylic acid in the plasticizer is effective for the storability of the plasticizer. The dicarboxylic acid for the polyester plasticizer for use in the invention is preferably an aliphatic dicarboxylic having from 4 to 20 carbon atoms, or an aromatic dicarboxylic acid having from 8 to 20 carbon atoms.

The aliphatic dicarboxylic acids having from 2 to 20 carbon atoms preferably used in the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

More preferred aliphatic dicarboxylic acids in these are malonic acid, succinic acid, maleic acid, fumaric acid, glutaric acid, adipic acid, azelaic acid, 1,4-cyclohexanedicarboxylic acid. Particularly preferred aliphatic dicarboxylic acids are succinic acid, glutaric acid and adipic acid.

The diol used for the high molecular weight agent are selected, for example, from aliphatic diols having from 2 to 20 carbon atoms and alkyl ether diols having from 4 to 20 carbon atoms.

Examples of the aliphatic diol having from 2 to 20 carbon atoms include an alkyldiol and an alicyclic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol(neopentyl glycol), 2,2-diethyl-1,3-propandiol(3,3-dimethylolpentane), 2-n-buthyl-2-ethyl-1,3-propandiol(3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol, polypropylene ether glycol, and combinations of these. The average degree of polymerization is not limited in particular, and it is preferably from 2 to 20, more preferably from 2 to 10, further preferably from 2 to 5, especially preferably from 2 to 4. As these examples, Carbowax resin, Pluronics resin and Niax resin are commercially available as typically useful polyether glycols.

In the invention, especially preferred is a high molecular weight agent of which the terminal is blocked with an alkyl group or an aromatic group. The terminal protection with a hydrophobic functional group is effective against aging at high temperature and high humidity, by which the hydrolysis of the ester group is retarded.

Preferably, the high molecular weight agent is protected with a monoalcohol residue or a monocarboxylic acid residue in order that both ends of the high molecular weight agent are not a carboxylic acid or a hydroxyl group.

In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol and benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, p-tert-amylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The high molecular weight agent may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The compounds having a positive birefringence are described in detail in Koichi Murai's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

The aromatic polyester-type polymers are those produced by copolymerization of the polyester polymer and a monomer having an aromatic ring. The monomer having an aromatic ring is preferably at least one monomer selected from an aromatic dicarboxylic acid having from 8 to 20 carbon atoms and an aromatic diol having from 6 to 20 carbon atoms.

The aromatic dicarboxylic acids having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, etc. More preferred aromatic dicarboxylic acids in these are phthalic acid, terephthalic acid, isophthalic acid.

Specific examples of aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

For the aromatic polyester polymer, in this invention, combined is the above-mentioned polyester and at least one of aromatic dicarboxylic acids and aromatic diols, in which the combination mode is not specifically defined. Different types of the ingredients may be combined in any desired mode. In the invention, especially preferred is the polymer additive terminated with an alkyl group or an aromatic group, as described above. For the termination, employable is the above-mentioned method.

(Retardation Depressor)

As the Rth controlling agent, for example, herein widely employable are phosphate ester compounds and other compounds than non-phosphate ester compounds that are known as additives for cellulose acylate films.

The polymer retardation depressor may be selected from phosphate polyester polymers, styrenic polymers and acrylic polymers, and their copolymers, and preferred are acrylic polymers and styrenic polymers. Preferably, the Rth depressor contains at least one polymer having a negative intrinsic birefringence such as a styrenic polymer and an acrylic polymer.

As a low molecular weight retardation depressor which is not a non-phosphate ester compound, following additives are preferably used. These additives may be solid or oily, or that is, they are not specifically defined in point of their melting point and boiling point thereof. For example, for the additive, UV absorbents at 20 degrees Celsius or lower and at 20 degrees Celsius or higher may be mixed, or degradation preventive agent may also be mixed in the same manner. IR absorbent dyes are described in, for example, JP-A 2001-194522. The time at which the additive is added may be in any stage in the step of dope preparation; however, the additive may be added in the final stage of the dope preparation step. Not specifically defined, the amount of the material to be added may be any one capable expressing the function thereof.

The low molecular weight Rth depressor that is a compound except non-phosphate esters is not specifically defined, and its details are described in JP-A 2007-272177, paragraphs [0066] to [0085].

The compounds of formula (1) described in JP-A 2007-272177, paragraphs [0066] to [0085] may be produced according to the following method.

The compounds of formula (1) in the patent reference may be obtained through condensation of a sulfonyl chloride derivative and an amine derivative.

The compounds of formula (2) in JP-A 2007-272177 can be obtained through dehydrating condensation of a carboxylic acid and an amine using a condensing agent (for example, dicyclohexylcarbodiimide (DCC) or the like), or through substitution reaction between a carboxylic acid chloride derivative and an amine derivative.

The retardation depressor is preferably a Rth depressor from the viewpoint of attain preferable Nz factor. The retardation depressor as the Rth depressor includes acrylic polymers and styrenic polymers, and low molecular weight compounds of formulae (3) to (7) in JP-A 2007-272177. Of those, preferred are acrylic polymers and styrenic polymers; and more preferred are acrylic polymers.

The retardation depressor may be preferably added to the film in a ratio of from 0.01 to 30% by mass of cellulose acetate, more preferably added in a ratio of from 0.1 to 20% by mass of cellulose acetate, particularly preferably added in a ratio of from 0.1 to 10% by mass of cellulose acetate.

When the amount to be added is at most 30% by mass, the miscibility of the additive with the cellulose resin is high and the formed film may be prevented from whitening. In the case where two or more different types of retardation depressor are used as combined, preferably, the total amount thereof falls within the above range.

(Retardation Enhancer)

The film of the invention, at least one retardation enhancer is preferably added to the low substitution layer of the film for making the film have a preferable retardation. Not specifically defined, the retardation enhancer includes rod-shaped compounds, discotic compounds and the non-phosphate ester compounds in which show retardation expression. Of the rod-shaped or discotic compounds, those having at least two aromatic groups are preferred for use as the retardation enhancer in the invention.

The amount of the retardation enhancer of a rod-shaped compound to be added is preferably from 0.1 to 30 parts by mass relative to 100 parts by mass of the cellulose acylate-containing polymer ingredient, more preferably from 0.5 to 20 parts by mass. Preferably, the amount of a discotic retardation enhancer to be added is preferably less than 3 parts by mass relative to 100 parts by mass of the cellulose acylate resin, more preferably less than 2 parts by mass, even more preferably less than 1 parts by mass.

A discotic compound is superior to a rod-shaped compound as an Rth retardation enhancer, and is therefore favorably used in ace where the film requires an especially large Rth retardation. Two or more different types of retardation enhancers may be used, as combined.

Preferably, the retardation enhancer has a maximum absorption in a wavelength range of from 250 to 400 nm, and preferably, it does not have substantial absorption in a visible light region.

Details of the retardation enhancer are described in p. 49, Koukai Gihou 2001-1745.

(Plasticizer)

Many compounds known as a plasticizer for the cellulose acylate may be used for the invention as the plasticizer. As the plasticizer, usable are phosphates or carboxylates. Examples of the phosphates include triphenyl phosphate (TPP) and tricresyl phosphate (TCP). The carboxylates are typically phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetylcitrate (OACTE) and tributyl O-acetylcitrate (OACTB). Examples of other carboxylates include butyl oleate, methylacetyl ricinoleate, dibutyl sebacate, and various trimellitates. Preferred for use herein are phthalate plasticizers (DMP, DEP, DBP, DOP, DPP, DEHP). More preferred are DEP and DPP.

(Antiaging Agent)

Any known antiaging agent (antioxidant) may be added to the cellulose acylate solution in the invention. For example, phenolic or hydroquinone-based antioxidants may be added, including 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, pentaerythrityl tetrakis[3-(3,5-di-tert-butyl-4-hydroxyphenyl)propionate], etc. Also preferred are phosphorus-containing antioxidants such as tris(4-methoxy-3,5-diphenyl)phosphite, tris(nonylphenyl) phosphite, tris(2,4-di-tert-butylphenyl)phosphite, bis(2,6-di-tert-butyl-4-methylphenyl)pentaerythritol diphosphite, bis(2,4-di-tert-butylphenyl)pentaerythritol diphosphite, etc. The amount of the antiaging agent to be added may be from 0.05 to 5.0 parts by mass relative to 100 parts by mass of the cellulose resin.

(UV Absorbent)

From the viewpoint of preventing the deterioration of polarizers and liquid crystals, a UV absorbent is favorably added to the cellulose acylate solution in the invention. Preferably, the UV absorbent has an excellent UV-absorbing capability at a wavelength of at most 370 nm, and has little absorption of visible light having a wavelength of at least 400 nm, from the viewpoint of good liquid crystal display capability. Preferred examples of the UV absorbent for use in the invention include hindered phenol compounds, hydroxybenzophenone compounds, benzotriazole compounds, salicylate compounds, benzophenone compounds, cyanoacrylate compounds, nickel complex compounds, etc. Examples of the hindered phenol compounds include 2,6-di-tert-butyl-p-cresol, pentaerythrityl tetrakis[3-(3,5-di-tert-butyl-4-hydroxyphenyl)propionate], N,N'-hexamethylenebis(3,5-di-tert-butyl-4-hydroxy-hydrocinn amide), 1,3,5-trimethyl-2,4,6-tris(3,5-di-tert-butyl-4-hydroxybenzyl)benzene, tris-(3,5-di-tert-butyl-4-hydroxybenzyl)isocyanurate, etc. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl) phenol), (2,4-bis(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinn amide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, pentaerythrityl tetrakis[3-(3,5-di-tert-butyl-4-hydroxyphenyl)propionate], etc. The amount of the UV absorbent to be added is preferably from 1 ppm to 1.0%, more preferably from 10 to 1000 ppm in terms of the ratio by mass thereof in the entire optical film.

(Matting Agent)

Matting agent is preferably added to the high substituent layer of the film of the invention from the viewpoint of film slide property and stable manufacture. The matting agent may be a matting agent of an inorganic compound or a matting agent of an organic compound.

Preferred examples of the matting agent of an inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin-antimony oxide, calcium carbonate, talc, clay, calcined kaolin, calcium phosphate, etc. More preferred are silicon-containing inorganic compounds and zirconium oxide. Particularly preferred is silicon dioxide since it can reduce the haze of cellulose acylate films. As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Preferred examples of the matting agent of an organic compound include polymers such as silicone resins, fluororesins, acrylic resins, etc. Above all, more preferred are silicone resins. Of silicone resins, even more preferred are those having a three-dimensional network structure. For example, usable are commercial products of Tospearl 103, Tospearl 105, Tospearl 18, Tospearl 120, Tospearl 145, Tospearl 3120 and Tospearl 240 (all trade names by Toshiba Silicone), etc.

When the matting agent is added to a cellulose acylate solution, any method is employable with no problem, as long as it can produce a desired cellulose acylate solution. For example, the additive may be added in the stage where a cellulose acylate is mixed with a solvent; or the additive may be added to a mixture solution prepared from a cellulose acylate and a solvent. Further, the additive may be added to and mixed with a dope just before the dope is cast, and this is a so-called direct addition method, in which the ingredients may be on-line mixed by screw kneading. Concretely, preferred is a static mixer such as an in-line mixer. As the in-line mixer, for example, preferred is a static mixer, SWJ (Toray's static tubular mixer, Hi-Mixer, by Toray Engineering). Regarding the mode of in-line addition, JP-A 2003-053752 describes an invention of a method for producing a cellulose acylate film wherein, for the purpose of preventing concentration unevenness and particle aggregation, the distance L between the nozzle tip through which an additive liquid having a composition differing from that of the main material dope and the start end of an in-line mixer is controlled to be at most 5 times the inner diameter d of the main material feeding line, thereby preventing concentration unevenness and aggregation of matting particles, etc. The patent reference discloses a more preferred embodiment, in which the distance (L) between the nozzle tip opening through which an additive liquid having a composition differing from that of the main material dope and the start end of the in-line mixer is controlled to be at most 10 times the inner diameter (d) of the feeding nozzle tip opening, and the in-line mixer is a static non-stirring tubular mixer or a dynamic stirring tubular mixer. More concretely, the patent reference discloses that the flow ratio of the cellulose acylate film main material dope/in-line additive liquid is from 10/1 to 500/1, more preferably from 50/1 to 200/1. JP-A 2003-014933 discloses an invention of providing a retardation film which is free from a trouble of additive bleeding and a trouble of interlayer peeling and which has good lubricity and excellent transparency; and regarding the method of adding additives to the film, the patent reference says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

In the film of the invention, the matting agent does not increase the haze of the film so far as a large amount of the agent is not added to the film. In fact, when the film containing a suitable amount of a matting agent is used in LCD, the film hardly brings disadvantages of contract reduction and bright spot formation. Not too small amount, the matting agent in the film can realize the creaking resistance and the scratch resistance of the film. From these viewpoints, the matting agent content is preferably from 0.01 to 5.0% by weight, more preferably from 0.03 to 3.0% by weight, even more preferably from 0.05 to 1.0% by weight.

(Layer Structure of Film)

The film of the invention may be a single layer or may be a laminate of two or more layers.

In case where the film of the invention is a laminate of two or more layers, the film preferably has a two-layered structure or a three-layered structure, more preferably a three-layered structure. The film having a three-layered structure preferably has a layer to be in contact with the metal support in producing the film by solution casting (hereinafter this may be referred to as a support-side surface, or a skin B layer), a layer to face the air interface opposite to the metal support (hereinafter this may be referred to as an air-side surface or a skin A surface), and one core layer sandwiched between these. Specifically, the film of the invention preferably has a three-layered structure of skin B layer/core layer/skin A layer.

In the case where the film includes the cellulose acylate, the degree of acyl substitution in the cellulose acylate in the individual layers may be the same; or different types of cellulose acylate may form one layer as combined. Preferably, the degree of acyl substitution in the cellulose acylate in the individual layers is the same from the viewpoint of regulating the optical properties of the film.

In case where the film of the invention has a three-layer structure, preferably, the cellulose acylate constituting the skin layer on both sides has the same degree of acyl substitution from the viewpoint of reducing the production cost.

(Haze)

The film of the invention preferably has a haze of less than 0.20%, more preferably less than 0.15%, further particularly less than 0.10%. Having a haze of less than 0.2%, the contrast ratio of a liquid crystal display device composed of the film is improvable and the transparency of the film is enough high to use as an optical film.

(Film Thickness)

Preferably, the mean thickness of the low substituent layer of the film of the invention is from 30 to 100 μm, more preferably from 30 to 80 μm, even more preferably from 30 to 70 μm. When the core layer has a mean thickness of at least 30 μm, the handlability of the film is favorably good in producing the film as a web. When the low substituent layer has a mean thickness of at most 70 μm, the film may readily follow the ambient humidity change and may keep its optical properties.

In case where the film of the invention has a three-layer or more multilayer laminate structure, the core layer preferably has a thickness of from 30 to 70 μm, more preferably from 30 to 60 μm, even more preferably from 30 to 50 μm.

In case where the film of the invention has a three-layer or more multilayer laminate structure, the skin layer on both sides (skin A layer and skin B layer) of the film preferably has a thickness of from 0.5 to 20 μm, more preferably from 0.5 to 10 μm, even more preferably from 0.5 to 3 μm.

(Film Width)

The film width of the film of the invention is preferably from 700 to 3000 mm, more preferably from 1000 to 2800 mm, particularly preferably from 1500 to 2500 mm.

The film of the invention is also preferably the film width thereof is from 700 to 3000 mm and ΔRe is at most 10 nm.

[Method for Producing Cellulose Acylate Film]

The method for producing a resin film of the invention (which referred to as the producing method of the invention hereinafter) including casting a dope having a resin and an organic acid represented by the following formula (1) on a metal support to prepare a dope film, wherein the content of the organic acid to the resin is from 0.1 to 20% by mass; and peeling away the dope film from the metal support:

$$X\text{-}L\text{-}(R^1)_n \quad \text{Formula (1)}$$

wherein X represents an acid group wherein the acid dissociation constant is 5.5 or less; L represents a single bond, or a di- or more valent linking group; $R^1$ represents a hydrogen atom, an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; n represents 1 in the case where L is a single bond, or represents the number expressed by:

(the valent number of L)−1 in the case where L is a di- or more valent linking group.

Hereinafter describes the details of the producing method of the invention.

The resin film of the invention is produced according to a solvent-casting method. Examples of production of a resin film according to a solvent-casting method are given in U.S. Pat. Nos. 2,336,310, 2,367,603, 2,492,078, 2,492,977, 2,492,978, 2,607,704, 2,739,069 and 2,739,070, British Patents 640731, 736892, JP-B 45-4554, 49-5614, and JPA Nos. syo 60-176834, syo 60-203430, and syo 62-115035, and their descriptions are referred to herein. The cellulose acetate film may be stretched. Regarding the method and condition for stretching treatment, for example, referred to are JPA Nos. syo 62-115035, hei 4-152125, hei 4-284511, hei 4-298310, and hei 11-48271.

[Casting Method]

A solution casting method is employable here, including, for example, a method of uniformly extruding a prepared dope through a pressure die onto a metal support, a doctor blade method where the dope once cast onto a metal support is treated with a blade for controlling its thickness, a reverse roll coater method where the film formation is controlled by the rolls rotating in opposite directions, etc. Preferred is the method using a pressure die. The pressure die includes a coat hunger die, a T-die, etc., any of which is preferably usable here. Apart from the methods mentioned herein, other various methods are also employable that have heretofore been known for film formation by solution casting of a cellulose triacetate film. The condition in solution casting may be suitably defined in consideration of the difference in the boiling point or the like of the solvents to be used; and the same effects as in the patent references can also be attained.

<Co-Casting>

In forming the film of the invention, it is preferable to employ a stack casting method such as a co-casting method, a successive casting method and a coating method. Above all, it is especially preferable to employ a co-casting method from the viewpoint of producing the film stably and reducing the producing cost.

Figure 2:
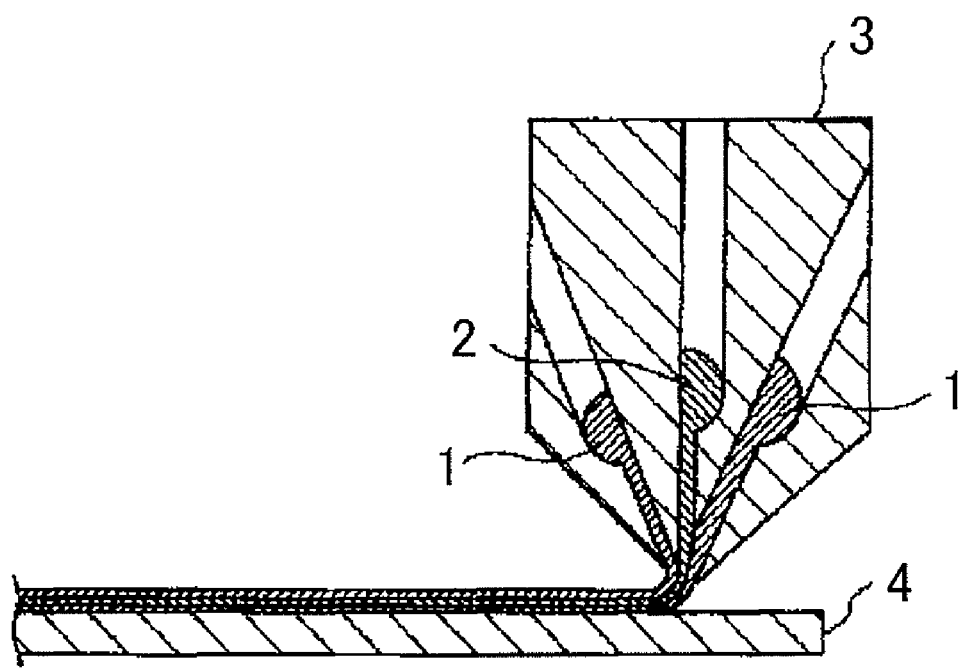
FIG. 2 is a schematic view showing one embodiment of casting a cellulose acylate film having three layers structure by multilayer simultaneous co-casting using a co-casting die.

In the case of achieving the production by the co-casting method or the successive casting method, first of all, a cellulose acetate dope for each layer is prepared. The co-casting method (multilayer simultaneous casting) is a casting method in which casting dopes for respective layers (which may also be three or more layers) are each extruded on a casting support (for example, a band or a drum) from a casting Gieser for extruding from separate slits or the like; and the respective layers are simultaneously cast and stripped off from the support at an appropriate timing, followed by drying to form a film. FIG. 2 is a cross-sectional view showing a state that three layers of dopes 1 for skin layer and a dope 2 for core layer are simultaneously extruded on a support 4 by using a co-casting Gieser 3.

The successive casting method is a casting method in which a casting dope for first layer is first extruded and cast on a casting support from a casting Gieser; a casting dope for second layer is then extruded and cast thereon after drying or without being dried; if desired, a dope is further cast and stack in this manner with respect to third or more layers; and the layers are stripped off from the support at an appropriate timing, followed by drying to form a film. In general, the coating method is a method in which a film for core layer is formed into a film by the solution fabrication method; a coating solution for coating on a skin layer is prepared; and the coating solution is coated and dried on the film on every surface or both surfaces at the same time by using an appropriate coating machine to form a film of a stack structure.

Preferably, the organic acid of formula (1) is made to exist only on the side of one surface of the resin film of the invention from the viewpoint of the releasability improving effect and the polarizing element durability improving effect of the film. For making the organic acid of formula (1) exist only on the side of one surface of the resin film, preferably employed is a method of adding the organic acid of formula (1) only to the casting dope for the specific layer in the lamination casting method.

Specifically, in case where the organic acid of formula (1) is made to exist only on the side of one surface of the resin film of the invention, preferably, the production method of the invention comprises co-casting at least two dopes onto a metal support, in which the organic acid of formula (1) is added to any one of the dope for the metal support-side layer or the dope for the air-side layer As a metal support running in an endless manner, which is used for producing the film of the invention to be favorably used, a drum in which a surface thereof is mirror-finished by chromium plating or a stainless steel belt (the belt may also be called a band) which is mirror-finished by surface polishing is useful. A pressure die to be used may be set up in the number of one or two or more in an upper part of the metal support. The number of the pressure die is preferably one or two. In the case where two or more pressure dies are set up, the amount of the dope to be cast may be divided in various proportions for the respective dies. Also, the dope may be sent to the dies in the respective proportions from plural precision metering gear pumps. The temperature of the dope (resin solution) which is used for casting is preferably from −10 to 55° C., and more preferably from 25 to 50° C. In that case, the solution temperature may be identical in all of the steps, or the solution temperature may be different in each place of the steps. In the case where the solution temperature is different, it would be better that the solution temperature just before casting is a desired temperature.

Moreover, although there is no restriction in particular about the material of the metal support, it is particularly preferable that it is made from SUS (for example, SUS316).

(Stretching Treatment)

In the producing method of the invention, the film is preferably subjected to a stretching treatment. As described previously, the film of the invention is preferably improved its optical performance. According to the stretching treatment, it is possible to impart such optical performance, and further-more, it is possible to impart desired retardation to the resin film of the invention. With respect to the stretching direction of the resin film of the invention, all of a width direction and a longitudinal direction are preferable, and a width direction is especially preferable from the viewpoint of subjecting the film to the following process for manufacturing a polarizer.

A method for achieving stretching in a width direction is described in, for example, JP-A-62-115035, JP-A-4-152125, JP-A-4-284211, JP-A-4-298310 and JP-A-11-48271. In the case of stretching in a longitudinal direction, for example, the film is stretched by adjusting the speed of conveyance rollers of the film to make a winding-up speed of the film faster than a peeling-off speed of the film. In the case of stretching in a width direction, the film can also be stretched by conveying the film while holding the width of the film by a tenter and gradually widening the width of the tenter. After drying the film, the film can also be stretched by using a stretching machine (preferably uniaxially stretched by using a long stretching machine).

A stretch ratio of the film of the invention is preferably from 5% to 200%, more preferably from 10% to 100%, particularly preferably from 20% to 50%.

In the case where the resin film of the invention is used as a protective film of a polarizer element, for the purpose of inhibiting light leakage in viewing a polarizer from an inclined direction, it is necessary to dispose a transmission axis of the polarizer element in parallel to an in-plane slow axis of the resin film of the invention. Since the transmission axis of a polarizer element in a rolled film state to be continuously produced is generally parallel to the width direction of the rolled film, in order to continuously stick a protective film composed of the polarizer element in a rolled film state and the resin film of the invention in a rolled film state, it is necessary that the in-plane slow axis of the protective film in a rolled film state is parallel to the width direction of the film. Accordingly, it is preferable that the film is more likely stretched in the width direction. Also, the stretching treatment may be achieved on the way of the fabrication step, and a raw film having been fabricated and wound up may be subjected to a stretching treatment. In the producing method of the invention, it is preferable that the stretching treatment is achieved on the way of the fabrication step because the film stretching may be carried out in a state of containing the residual solvent.

(Drying)

The producing method of the invention preferably includes drying the resin film of the invention and stretching it at a temperature not lower than Tg-10° C. from the viewpoint of retardation expression.

In general, examples of drying of the dope on the metal support according to the production of the resin film of the invention include a method of blowing hot air from the surface side of the metal support (drum or belt), namely from the surface of a web on the metal support; a method of blowing hot air from the back surface of the drum or belt; and a back surface liquid heat conduction method by bringing a temperature-controlled liquid in contact with the back surface of the belt or drum, which is the side thereof opposite the dope casting surface, and heating the drum or belt due to heat conduction to control the surface temperature. Of these methods, the back surface liquid heat conduction method is preferable. The surface temperature of the metal support before casting may be arbitrary so far as it is not higher than a boiling point of the solvent to be used in the dope. However, in order to accelerate drying or eliminate fluidity on the metal support, it is preferable that the surface temperature of the metal support is set up at a temperature of from 1 to 10° C. lower than a boiling point of the solvent having the lowest boiling point among the solvents to be used. However, this limitation is not necessarily applied in the case where the casting dope is cooled and peelped off without being dried.

(Peeling)

The producing method of the invention includes peeling away the dope film from the metal support. The method for peeling is not restricted and known method can be used to improve the peeling aptitude.

In order to adjust the thickness of the film to a desired value, the concentration of solids to be contained in the dope, the gap of a slit of a nozzle of the die, the extrusion pressure of the die, the speed of the metal support, etc. may be properly adjusted.

Thus obtained resin film of the invention is preferably wound up in a length of from 100 to 10,000 m, more preferably from 500 to 7,000 m, and further preferably from 1,000 to 6,0.00 m per roll. In winding up, the film is preferably knurled at least in one edge thereof. The width of the knurl is preferably from 3 mm to 50 mm, and more preferably from 5 mm to 30 mm; and the height of the knurl is preferably from 0.5 to 500 μm, and more preferably from 1 to 200 μm. The edge of the film may be knurled on one or both surfaces thereof.

In general, in a large-sized screen display device, since lowering in contrast and tinting in an inclined direction become remarkable, the film of the invention is especially suitable for the use in a large-sized screen display device. In the case of using the film of the invention as an optical compensation film for large-sized screen display device, for example, it is preferable that a film is formed in a width of 1,470 mm or more. Also, the film of the invention includes not only a film of an embodiment of a film piece cut into a size such that it is able to be installed as it stands in a liquid crystal display device but a film of an embodiment in which the film is prepared in a longitudinal form by means of continuous production and wound up in a rolled state. In the optical compensation film of the latter embodiment, after storage and conveyance in that state or the like, the film is cut into a desired size and used at the time of actually installing in a liquid crystal display device or sticking to a polarizer or the like. Also, after sticking the film in a longitudinal form to a polarizer composed of a polyvinyl alcohol film or the like as prepared similarly in a longitudinal form, when the resulting film is actually installed in a liquid crystal display device, it is cut into a desired size and used. As one of the embodiments of an optical compensation film wound up in a rolled state, an embodiment in which the film is wound up in a rolled state having a roll length of 2,500 m or more is exemplified.

[Polarizer]

Also, the invention is concerned with a polarizer having at least one sheet of film of the invention.

An embodiment of the polarizer of the invention includes not only a polarizer of an embodiment of a film piece cut into a size such that it is able to be installed as it stands in a liquid crystal display device but a polarizer of an embodiment in which the polarizer is prepared in a longitudinal form by means of continuous production and wound up in a rolled state (for example, an embodiment having a roll length of 2,500 mm or more or 3,900 m or more). In order to make it suitable for a large-sized screen liquid crystal display device, the polarizer is prepared so as to have a width of 1,470 mm or more.

The concrete composition of polarizer of the invention is not restricted and known composition can be adopted, and, for example, the composition described in FIG. 6 in JP-A 2008-262161 can be adopted.

[Liquid Crystal Display Device]

The invention also relates to a liquid-crystal display device that comprises the polarizer of the invention.

The liquid-crystal display device of the invention comprises a liquid-crystal cell and a pair of polarizers arranged on both sides of the liquid-crystal cell, in which at least one polarizers is the polarizer of the invention. Preferably, the liquid-crystal display device is a IPS, OCB or VA-mode liquid-crystal display device.

The concrete constitution of the liquid-crystal display device is not specifically defined, for which any known constitution is employable. For example, the constitution described in FIG. 1 is one example of the liquid-crystal display device of the invention. The constitution described in FIG. 2 in JP-A 2008-262161 is also preferred for the liquid-crystal display device of the invention.

EXAMPLES

The characteristics of the invention are described more concretely with reference to the following Examples. In the following Examples, the material and agents used, its amount and the ratio, the details of the treatment process may be suitably modified or changed without not overstepping the purpose of the invention. Accordingly, the invention should not be limitatively interpreted by the Examples mentioned below.

Example 101

<Manufacturing Protective Film of Polarizer]
(Preparation of Cellulose Acylate Solution)

The following composition was put into a mixing tank and stirred to dissolve the ingredients to prepare cellulose acylate solution 1.

| Composition of Cellulose Acylate Solution 1 | |
|---|---|
| Cellulose acylate (acetyl substitution degree is 2.45, degree of polymerization is 370) | 100.0 mas. pts. |
| Polycondensed ester A having weight average molecular weight of 1200 | 7.0 mas. pts. |
| Methylene chloride (first solvent) | 402.0 mas. pts. |
| Methanol (second solvent) | 60.0 mas pts. |

Polycondensed ester A

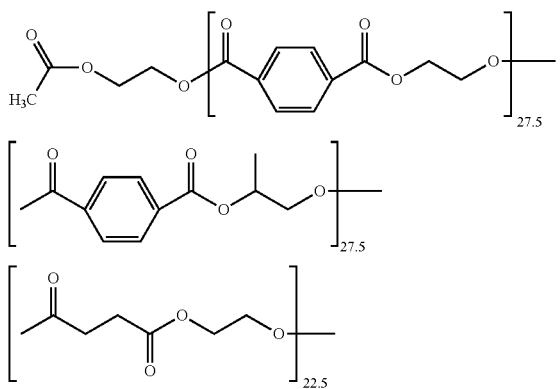

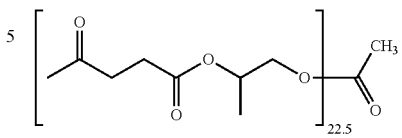

(Preparation of Mat Agent Solution 2)

The following composition was put into a disperser and dispersed to prepare a mat agent solution 2.

| Composition of Mat Agent Solution 2 | |
|---|---|
| Silica particles having a mean particle size of 20 nm (Aerosil R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution 1 | 10.3 mas. pts. |

(Preparation of Organic Acid Solution 3)

The following composition was put into a mixing tank and dissolved by stirring under heat to prepare an organic acid solution 3.

| Composition of Additive Solution 3 | |
|---|---|
| Poem K-37V (produced by Riken Vitamin Co., Ltd.) | 20.0 mas. pts. |
| Methylene chloride (first solvent) | 67.2 mas. pts. |
| Methanol (second solvent) | 10.0 mas. pts. |
| Cellulose acylate solution 1 | 12.8 mas. pts. |

1.3 Parts by mass of Matting Agent Solution 2 and 3.1 parts by mass of Organic Acid Solution 3 were mixed using an in-line mixer after filtering each solution, 95.6 parts by mass of Cellulose Acylate Solution 1 was further added and mixed using an in-line mixer, the mixture was then cast using a band casting machine, and the film was dried at 100° C. until reaching a residual solvent content of 40% and then peelped off. The peeled-off film was stretched at a stretch ratio of 30% in the cross direction of machine direction by using a tenter at an ambient temperature of 150° C. Then, the stretched film was dried at 140° C. for 20 minutes. The produced film had a thickness of 55 μm.

<Saponification Treatment of Protective Film of Polarizer>

The protective film of polarizer 101 produced was dipped in a 2.3 mol/L aqueous solution of sodium hydroxide at 55° C. for 3 minutes. Next, the film was washed in a water washing bath at room temperature and then neutralized with 0.05 mol/L sulfuric acid at 30° C. Next, it was washed again in a water washing bath at room temperature and dried in a hot air stream at 100° C. Thus, the surface of the protective film of polarizer 101 was saponified.

<Production of Polarizer>

Iodine was adsorbed by the stretched polyvinyl alcohol film to prepare a polarizing element.

The saponificated protective film of polarizer of Example 101 was stuck to one surface of the polarizing element, using a polyvinyl alcohol adhesive. A commercial cellulose triacetate film (Fujitac TD80UF, by FUJIFILM Corporation) was saponified in the same method, and the saponificated cellulose triacetate film was stuck to the other side of the polarizing element, using a polyvinyl alcohol adhesive.

The films were so stuck to the polarizing element that the transmission axis of the polarizing element could be parallel to the slow axis of the protective film of polarizer produced in Example 101 and that the transmission axis of the polarizing element could be perpendicular to the slow axis of the commercial cellulose triacetate film.

Thus, the polarizer of Example 101 was manufactured.

Example 102 to 113 and 115 to 123, Comparative Example 201 to 205

<Manufacturing Protective Film of Polarizer of Example 102 to 113 and 115 to 123, and Comparative Example 201 to 205>

Protective film of polarizers of Example 102 to 113 and Comparative Example 201 to 205 were manufactured in the same way as in Example 101 but changing the acyl substitution degree of cellulose acylate, the addition amount of the polycondensed ester A, the type and addition amount of the organic acid and film thickness as listed in the following Tables 1 and 2.

In Tables 1 and 2, the addition amount of the organic acids express parts by mass based on 100 parts by mass of the cellulose acylate resin. In Tables 1 and 2, citric and oleic acid esters of glycerol is STEP SS produced by Kao Corporation. And oleic acid, undecanoic acid, citrate acid and valeric acid are produced by Tokyo Chemical Industry Co., Ltd. Moreover, citrate acid used in Comparative Example 201 was used as example compound in JP-B 4,136,054, and this Comparative Example 201 was test for the effect of the above mentioned compound.

(Production of Acrylic Resin-Containing Film)

The dope prepared in the above was uniformly cast onto a stainless band support having a width of 2 m at a temperature of 22° C. On the stainless band support, solvent was evaporated away until the residual solvent amount could reach 100%, and the film was peeled away from the support.

The solvent was evaporated away from the peeled, acrylic resin-containing film at 35° C., then the film was slit to have a width of 1.6 m, and dried at a temperature of 135° C. while stretched by 1.1 times in the cross direction using a tenter. After stretched with a tenter, the film was relaxed at 130° C. for 5 minutes, and then while conveyed in a drying zone at 120° C. and 130° C. with a large number of rolls, drying the film was finished. The film was slit to have a width of 1.5 m, and its both sides each having a width of 10 mm were knurled to a height of 5 μm. Then, this was wound up at an initial tension of 220 N/m and a final tension of 110 N/m into a roll having an inner diameter of 6 inches, thereby giving an acrylic resin containing film. The draw ratio in MD stretching, as computed from the rotation speed of the stainless band support and the running speed of the tenter, was 1.1 times. This is a polarizer protective film of Example 114.

(Retardation)

In this specification, Re (λ) and Rth (λ) are retardation in plane (nm) and retardation along the thickness direction (nm), respectively, at a wavelength of λ. The wavelength of λ is 550 nm unless otherwise specified. Re (λ) is measured by applying light having a wavelength of λ nm to a film in the normal direction of the film, using KOBRA 21ADH or WR (by Oji Scientific Instruments). Rth (λ) is calculated by KOBRA 21ADH or WR based on six Re (λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film. Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the formulae (31) and (32) below. In the above measurement, as the estimated value of the mean refractive index, values in Polymer Handbook (by John Wiley & Sons, Inc.) or those in polymer film catalogues may be used. Materials of which the mean refractive index is unknown may be analyzed with an Abbe's refractometer to determine their data. For example, the mean refractive index values of some optical films are as follows: cellulose acylate (1.48), cycloolefin polymer (1.52), polycarbonate (1.59), polymethylmethacrylate (1.49) and polystyrene (1.59). By inputting the value of these average refraction indices and thickness, KOBRA 21ADH or WR computes nx, ny, nz. From the computed nx, ny, nz, Nz=(nx−nz)/(nx−ny) is computed further.

$$Re(\theta) = \left[ nx - \frac{(ny \times nz)}{\sqrt{\left\{ ny \sin\left( \sin^{-1}\left( \frac{\sin(-\theta)}{nx} \right) \right) \right\}^2 + \left\{ nz \cos\left( \sin^{-1}\left( \frac{\sin(-\theta)}{nx} \right) \right) \right\}^2}} \right] \times \frac{d}{\cos\left\{ \sin^{-1}\left( \frac{\sin(-\theta)}{nx} \right) \right\}}$$

Formula (31)

$$Rth = \left[ \frac{nx + ny}{2} - nz \right] \times d$$

Formula (32)

wherein Re (θ) represents a retardation value in the direction inclined by an angle θ from the normal direction; "d" represents a thickness of the film; nx represents a refractive index in the in-plane slow axis direction; ny represents a refractive index in the in-plane direction perpendicular to nx; and nz represents a refractive index in the direction perpendicular to nx and ny.

The mean refractive index n which is used above is determined with Abbe's refractometer 2-T manufactured by Atago.

The resin film of the invention preferably has an Re of from 0 to 200 nm, more preferably from 0 to m 150 nm, particularly preferably 0 to 100 nm.

The resin film of the invention preferably has an Rth of from −10 to 400 nm, more preferably from −10 to 350 nm, particularly preferably −10 to 300 nm.

{Saponification Treatment of Protective Film of Polarizer and Production of Polarizer}

Each protective film of polarizer of Example 102 to 114 and Comparative Example 201 to 205 was saponificated and manufactured in the same way as in Example 101, and then the polarizer of each Examples and Comparative Examples was manufactured.

(Evaluation of Polarizer Durability)

A cross transmittance in the wavelength of 410 nm of each polarizer of Examples and Comparative Examples manufactured above was measured in the manner described in this invention.

Then, a cross transmittance of each polarizer was measured in the same manner described above after preserved under 60°

C. and relative humidity 95% for 500 hours. The cross transmittance variation of the polarizer before and after the preservation was calculated and the result was shown in Tables 1 and 2 as polarizer durability. In addition, the relative humidity under environment without humidity control was fall within the range of 0% to 20%.
(Evaluation of Corrosion Resistance of Organic Acid)
20 g of the organic acid solution prepared in Example 1 was weighed in an autoclave, and a SUS316 test piece having a thickness of 0.5 cm, as cut to have a width of 2 cm and a length of 3 cm, was dipped therein. The autoclave was closed, and kept at 90° C. for 72 hours, then the autoclave was opened, and the SUS316 test piece therein was checked for corrosion, and the change, if any, in the organic acid solution to be caused by the corrosion was observed and evaluated according to the following criteria.
1: There was no change in the smoothness of the surface of the test piece, and the organic acid solution was colorless and transparent.
2: The change in the smoothness of the surface of the test piece was small, but the organic acid solution yellowed.
3: The surface of the test piece was roughened, and the organic acid solution was brownish red and was cloudy.
(Releasability Evaluation)
The in-line mixed dope prepared in Example 101 was cast on a flat and smooth stainless steel plate (support) to be about 1 mm thick thereon, then left at room temperature for 4 minutes, and its releasability from the support was evaluated according to the following criteria.
1: With no peeling resistance, the film was peeled smoothly, and the film surface was flat and smooth.
2: Though with some peeling resistance, the film was peeled smoothly, and the film surface was flat and smooth.
3: With great peeling resistance, the film could not be peeled smoothly, or the film left its residue remaining on the stainless steel.

The evaluation results are shown in Tables 1 and 2.
In the following Tables 1 and 2, b) indicates the amount of the acid (mmol) relative to 100 parts by mass of cellulose acylate; c) means that the cellulose acylate was produced according to the method of USP 2009/0096962.

TABLE 1

| | Cellulose acylate | | | | Acrylic resin | Polycondensed polyester A | Organic acid | |
|---|---|---|---|---|---|---|---|---|
| | Acetyl substitution degree | Propionyl substitution degree | Total acyl substitution degree | Amount [mass. pts.] | Amount [mass. pts.] | Amount [mass. pts.] | Type | Acid dissociation constant |
| EX. 101 | 2.45 | 0.00 | 2.45 | 100 | 0 | 17 | Citric and oleic acid esters of glycerol | 3.2 |
| EX. 102 | 2.45 | 0.00 | 2.45 | 100 | 0 | 17 | Citric and oleic acid esters of glycerol | 3.2 |
| EX. 103 | 2.45 | 0.00 | 2.45 | 100 | 0 | 17 | Citric and oleic acid esters of glycerol | 3.2 |
| EX. 104 | 2.45 | 0.00 | 2.45 | 100 | 0 | 17 | Citric and oleic acid esters of glycerol | 3.2 |
| EX. 105 | 2.45 | 0.00 | 2.45 | 100 | 0 | 17 | Stearic, palmitic and succinic acid esters of glycerol | 4.6 |
| EX. 106 | 2.45 | 0.00 | 2.45 | 100 | 0 | 17 | Oleic acid | 4.9 |
| EX. 107 | 2.45 | 0.00 | 2.45 | 100 | 0 | 17 | Undecanoic acid | 4.8 |
| EX. 115 | 2.45 | 0.00 | 2.45 | 100 | 0 | 17 | N-(2,6-diethylphenyl-carbamoylmethyl)imino-diacetic acid | 4.8 |
| EX. 118 | 2.45 | 0.00 | 2.45 | 100 | 0 | 17 | N-benzyliminodiacetic acid | 3.2 |
| EX. 121 | 2.45 | 0.00 | 2.45 | 100 | 0 | 17 | lauraminodiacetic acid | 4.5 |
| Comp. EX. 201 | 2.45 | 0.00 | 2.45 | 100 | 0 | 17 | Citric acid | 4.0 |
| Comp. EX. 202 | 2.45 | 0.00 | 2.45 | 100 | 0 | 17 | Valeric acid | 4.8 |
| Comp. EX. 203 | 2.45 | 0.00 | 2.45 | 100 | 0 | 17 | Nothing | — |
| Comp. EX. 206 | 2.45 | 0.00 | 2.45 | 100 | 0 | 17 | Citric and oleic acid esters of glycerol | 3.2 |
| Comp. EX. 207 | 2.45 | 0.00 | 2.45 | 100 | 0 | 17 | Citric and oleic acid esters of glycerol | 3.2 |
| Comp. EX. 208 | 2.45 | 0.00 | 2.45 | 100 | 0 | 17 | Tributyl citrate | — |
| Comp. EX. 209 | 2.45 | 0.00 | 2.45 | 100 | 0 | 17 | Tributyl borate | 6.0 |

| | Organic acid | | | | Film properties | | | Polarizer durability: Cross transmittance variation [%] 60° C. rerative humidity 95% 300 hours | Peeling aptitude | SUS erosion |
|---|---|---|---|---|---|---|---|---|---|---|
| | Acid group X | $R^1$ | Amount [mass. pts.] | Amount[b] [mmol] | Thickness [μm] | Re [nm] | Rth [nm] | | | |
| EX. 101 | Carboxyl | C17 alkenyl | 0.5 | 0.5 | 55 | 55 | 126 | 0.27 | 2 | 1 |
| EX. 102 | Carboxyl | C17 alkenyl | 1.0 | 1.1 | 55 | 54 | 125 | 0.25 | 1 | 1 |
| EX. 103 | Carboxyl | C17 alkenyl | 2.0 | 2.1 | 55 | 53 | 122 | 0.15 | 1 | 1 |
| EX. 104 | Carboxyl | C17 alkenyl | 4.0 | 4.2 | 55 | 50 | 119 | 0.10 | 1 | 1 |
| EX. 105 | Carboxyl | C17 alkyl/ C15 alkyl | 2.0 | 2.1 | 55 | 52 | 122 | 0.18 | 1 | 1 |
| EX. 106 | Carboxyl | C17 alkenyl | 1.0 | 3.5 | 55 | 53 | 123 | 0.16 | 2 | 2 |
| EX. 107 | Carboxyl | C10 alkyl | 0.5 | 2.7 | 55 | 50 | 121 | 0.14 | 2 | 2 |
| EX. 115 | Carboxyl | diphenylethyl | 1.0 | 3.0 | 55 | 52 | 124 | 52 | 1 | 1 |

TABLE 1-continued

| | | | | | | | | | | |
|---|---|---|---|---|---|---|---|---|---|---|
| EX. 118 | Carboxyl | phenyl | 1.0 | 2.0 | 55 | 52 | 123 | 52 | 1 | 1 |
| EX. 121 | Carboxyl | C11 alkyl | 1.0 | 2.7 | 55 | 50 | 121 | 50 | 1 | 1 |
| Comp. EX. 201 | Carboxyl | substituted C3 alkyl | 0.5 | 8.1 | 55 | 54 | 125 | 0.11 | 2 | 3 |
| Comp. EX. 202 | Carboxyl | C4 alkyl | 0.5 | 4.9 | 55 | 54 | 124 | 0.12 | 2 | 3 |
| Comp. EX. 203 | — | — | 0.0 | 0.0 | 55 | 56 | 126 | 0.35 | 3 | 2 |
| Comp. EX. 206 | Carboxyl | C17 alkenyl | 0.05 | 0.05 | 55 | 56 | 125 | 0.35 | 3 | 2 |
| Comp. EX. 207 | Carboxyl | C17 alkenyl | 21.0 | 22.1 | 55 | 37 | 81 | 0.60 | 1 | 1 |
| Comp. EX. 208 | — | — | 2.0 | 0.0 | 55 | 53 | 123 | 0.33 | 3 | 2 |
| Comp. EX. 209 | Nothing (sealed borate) | C4 alkyl | 2.0 | 9.0 | 55 | 40 | 95 | 0.34 | 3 | 2 |

TABLE 2

| | Film Properties | | | Polarizer durability: Cross transmittance variation [%] 60° C. | Change of Mw of resin [Mw after preserved/Mw before preserved × 100%] 80° C. | | |
|---|---|---|---|---|---|---|---|
| | Re [nm] | Rth [nm] | Surface sticked to polarizer element | rerative humidity 95% 300 hours | rerative humidity 90% 150 hours | Peeling aptitude | SUS erosion |
| EX. 601 | 53 | 123 | Support side skin layer | 0.29 | 100 | 1 | 1 |
| EX. 602 | 53 | 123 | Support side skin layer | 0.20 | 100 | 1 | 1 |
| EX. 603 | 52 | 121 | Support side skin layer | 0.12 | 100 | 1 | 1 |
| EX. 604 | 51 | 120 | Support side skin layer | 0.11 | 99 | 1 | 1 |
| EX. 605 | 52 | 122 | Support side skin layer | 0.13 | 100 | 1 | 1 |
| EX. 606 | 52 | 122 | Support side skin layer | 0.14 | 100 | 1 | 1 |
| EX. 607 | 51 | 121 | Support side skin layer | 0.09 | 99 | 1 | 1 |
| EX. 611 | 51 | 121 | Support side skin layer | 0.19 | 100 | 1 | 1 |
| EX. 613 | 51 | 121 | Support side skin layer | 0.22 | 100 | 1 | 1 |
| EX. 615 | 50 | 120 | Support side skin layer | 0.25 | 99 | 1 | 1 |
| Comp. EX. 701 | 52 | 122 | Support side skin layer | 0.16 | 97 | 2 | 3 |
| Comp. EX. 702 | 50 | 120 | Support side skin layer | 0.15 | 99 | 1 | 1 |
| Comp. EX. 703 | 52 | 122 | Support side skin layer | 0.36 | 90 | 2 | 1 |
| Comp. EX. 704 | 53 | 123 | Support side skin layer | 0.39 | 100 | 3 | 2 |
| EX. 608 | 3 | 40 | Air side skin layer | 0.07 | 100 | 2 | 1 |
| EX. 609 | 3 | 41 | Air side skin layer | 0.05 | 100 | 2 | 1 |
| EX. 610 | 3 | 40 | Air side skin layer | 0.03 | 100 | 2 | 1 |
| EX. 612 | 4 | 43 | Air side skin layer | 0.08 | 100 | 2 | 1 |
| EX. 614 | 4 | 42 | Air side skin layer | 0.07 | 100 | 2 | 1 |
| EX. 616 | 3 | 42 | Air side skin layer | 0.08 | 100 | 2 | 1 |
| Comp. EX. 705 | 4 | 43 | Air side skin layer | 0.15 | 100 | 3 | 2 |
| Comp. EX. 706 | 4 | 42 | Air side skin layer | 0.13 | 99 | 2 | 3 |
| Comp. EX. 707 | 2 | 36 | Air side skin layer | 0.06 | 86 | 2 | 3 |

From the results in Tables 1 and 2, it is known that the polarizer comprising the polarizer protective film of the invention is favorable as causing little degradation of the polarizing element after aged in high-temperature high-humidity condition. In addition, it is also known that the resin film containing a specific organic acid of the invention has good releasability and hardly corrodes SUS, and is therefore favorable from the viewpoint of producibility.

The same applies also to the resin film and the polarizer in Example 114.

After peeling off two polarizers of a commercially available liquid crystal television set (BRAVIA J5000, manufactured by SONY Corp.), a sheet of Polarizer of the present invention which the protective film of polarizer 101 was used was laminated to the viewer side and the backlight side one by one, respectively, through a adhesive agent such that the protective film of polarizer 101 came to the liquid crystal cell side. These polarizers were disposed in a cross-Nicol arrangement where the transmission axis of the polarizer on the viewer side ran in the up/down direction and the transmission axis of the polarizer on the backlight side ran in the right/left direction. When the thus-produced liquid crystal display device of the present invention was observed from the oblique direction, small contrast change and small color tint change were advantageously obtained in case where the atmosphere humidity was changed; and reduction of contrast was small in case where the liquid crystal display device of the present invention was used for a long time under the high temperature and high humidity condition; each as compared with the commercially available liquid crystal television set.

Example 401

(Preparation of Cellulose Acylate)

According to the method described in JP-A 10-45804 and 08-231761, a cellulose acylate was produced, and its degree of substitution was measured. Concretely, as a catalyst, sulfuric acid was added in an amount of 7.8 parts by mass relative to 100 parts by mass of cellulose, and a carboxylic acid as a material for the acyl group was added for acylation at 40° C. In this process, the type and the amount of the carboxylic acid were controlled to thereby control the type and the degree of acyl substitution. After the acylation, the product was ripened at 40° C. The low-molecular-weight ingredient of the cellulose acylate was washed away with acetone.

(Preparation of Cellulose Acylate Solution C01 for Low Acyl Substitution Degree Layer)

The following composition was put into a mixing tank and dispersed to dissolve each ingredient and prepare the cellulose acylate solution the solid concentration of which was 22% by mass. The viscosity of the cellulose acylate solution was 60 Pa s.

| | |
|---|---|
| Cellulose acylate (acetyl substitution degree is 2.45) | 100.0 mas. pts. |
| Polycondensed ester D | 17.0 mas. pts. |
| Poem K-37V (produced by Riken Vitamin Co., Ltd.) | 3.0 mas. pts. |
| Methylene chloride | 365.5 mas. pts. |
| Methanol | 54.6 mas. pts. |

The polycondensed ester D was a copolymer of terephthalic acid/succinic acid/propylene glycol/ethylene glycol (27.5/22.5/25/25 (% by mol)).
(Preparation of Cellulose Acylate Solution S01 for High Acyl Substitution Degree Layer)

The following composition was put into a mixing tank and dispersed to dissolve each ingredient and prepare the cellulose acylate solution. The addition amount of the solvents (methylene chloride and methanol) were suitably adjusted to control the concentration of solids in each cellulose acylate solution falling within the value listed in the following Table 3.

| | |
|---|---|
| Cellulose acylate (acetyl substitution degree is 2.79) | 100.0 mas. pts. |
| Polycondensed ester D | 19.0 mas. pts. |
| Silica particles having a mean particle size of 20 nm (Aerosil R972, by Nippon Aerosil) | 0.15 mas. pts. |
| Methylene chloride | 395.5 mas. pts. |
| Methanol | 59.0 mas. pts. |

The solid concentration of the prepared cellulose acylate solution S01 for high acyl substitution degree layer was 20.0% by mass and the viscosity of the cellulose acylate solution was 30 Pa s.
(Formation of Polarizer Protective Film 401)

The cellulose acylate solution C01 for low-substitution layer was cast to have a thickness of 56 μm, with the cellulose acylate solution S01 for high-substitution layer cast to form a skin A layer (outermost layer on the air interface side) and a skin B layer (outermost layer on the metal support side) each having a thickness of 2 μm. The formed web (film) was peeled from the band, then clipped, and while the residual solvent amount therein was from 20 to 5% relative to the mass of the entire film, this was laterally stretched by 1.08 times at 140° C. using a tenter. Next, the film was unclipped, then dried at 130° C. for 20 minutes, and further using a tenter, this was again laterally stretched by 1.2 times at 180° C., thereby producing a polarizer protective film 401 of the invention.

The amount of the residual solvent in the web is defined as follows.

The amount of the residual solvent (% by mass)= $\{(M-N)/N\} \times 100$

M represents the mass of a web at any point; and N represents the mass of the web after being dried at 120° C. for two hours.

Example 402

(Preparation of Cellulose Acylate Solution C02 for Low Acyl Substitution Degree Layer)

The following composition was put into a mixing tank and dispersed to dissolve each ingredient and prepare the cellulose acylate solution the solid concentration of which was 22% by mass. The viscosity of the cellulose acylate solution was 60 Pa s.

| | |
|---|---|
| Cellulose acylate (acetyl substitution degree is 2.45) | 100.0 mas. pts. |
| Polycondensed ester D | 19.0 mas. pts. |
| Poem K-37V (produced by Riken Vitamin Co., Ltd.) | 3.0 mas. pts. |
| Compound I-2 | 2.0 mas. pts. |
| Methylene chloride | 365.5 mas. pts. |
| Methanol | 54.6 mas. pts. |

The compound 1-2 was a compound having following structure.

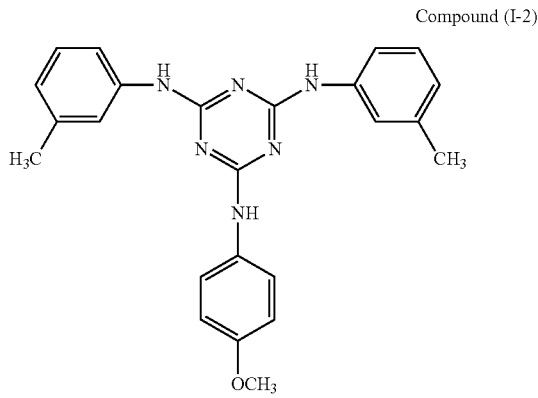

Compound (I-2)

(Preparation of Cellulose Acylate Solution S02 for High Acyl Substitution Degree Layer)

The following composition was put into a mixing tank and dispersed to dissolve each ingredient and prepare the cellulose acylate solution. The addition amount of the solvents (methylene chloride and methanol) were suitably adjusted to control the concentration of solids in each cellulose acylate solution falling within the value listed in the following Table 3.

| | |
|---|---|
| Cellulose acylate (acetyl substitution degree is 2.79) | 100.0 mas. pts. |
| Polycondensed ester D | 11.0 mas. pts. |
| Silica particles having a mean particle size of 20 nm (Aerosil R972, by Nippon Aerosil) | 0.15 mas. pts. |
| Methylene chloride | 395.5 mas. pts. |
| Methanol | 59.0 mas. pts. |

The solid concentration of the prepared cellulose acylate solution S02 for high acyl substitution degree layer was 19.7% by mass and the viscosity of the cellulose acylate solution was 40 Pa s.
(Preparation of Cellulose Acylate Sample)

The cellulose acylate solution C02 for low-substitution layer was cast to have a thickness of 56 μm, with the cellulose acylate solution S02 for high-substitution layer cast to form a skin A layer and a skin B layer each having a thickness of 2 μm. The formed web (film) was peeled from the band, then clipped, and while the residual solvent amount therein was from 20 to 5% relative to the mass of the entire film, this was laterally stretched by 1.08 times at 140° C. using a tenter. Next, the film was unclipped, then dried at 130° C. for 20 minutes, and further using a tenter, this was again laterally stretched by 1.2 times at 180° C., thereby producing a polarizer protective film 402 of the invention.

The residual solvent amount was computed according to the following formula.

Residual Solvent Amount (% by mass)=$\{(M-N)/N\}\times 100$, wherein M indicates the mass of the web at a given point in time; N indicates the mass of the web of which M had been measured, after dried at 120° C. for 2 hours.

Example 403

Protective film of polarizer of Example 403 was manufactured in the same way as in Example 402 but changing the compound 1-2 to the following compound I-1.

Compound I-1

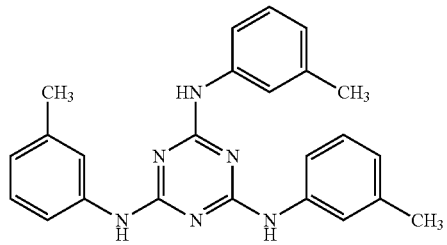

Example 501 to 503

(Manufacture of Liquid Crystal Display Device)

Thus produced each protective film of polarizer of Example 401 to 403 was saponificated and manufactured in the same way as in Example 101, and then the polarizer of each Examples was manufactured. Further, liquid crystal display device of Example 501 to 503 were manufactured in the same way as in Example 301 by replacing each polarizers of the commercially available liquid crystal television set to the protective films of polarizer of Example 401 to 403. When the thus-produced liquid crystal display device of Example 501 to 503 were observed from the oblique direction, small contrast change and small color tint change were advantageously obtained in case where the atmosphere humidity was changed; and reduction of contrast was small in case where the liquid crystal display device of the present invention was used for a long time under the high temperature and high humidity condition; each as compared with the commercially available liquid crystal television set.

Example 601

{Manufacturing Protective Film of Polarizer}
<Preparation of Dope for Support Side Skin Layer 601>
(Preparation of Cellulose Acylate Solution)
The following composition was put into a mixing tank and stirred to dissolve the ingredients to prepare cellulose acylate solution 1.

| Composition of Cellulose Acylate Solution 1 | |
|---|---|
| Cellulose acylate (acetyl substitution degree is 2.45, degree of polymerization is 370) | 100.0 mas. pts. |
| Polycondensed ester G having weight average molecular weight of 1200 | 17.0 mas. pts. |
| Methylene chloride (first solvent) | 402.0 mas. pts. |
| Methanol (second solvent) | 60.0 mas. pts. |

| Composition of Cellulose Acylate Solution 1 | |
|---|---|
| Polycondensed ester A | |

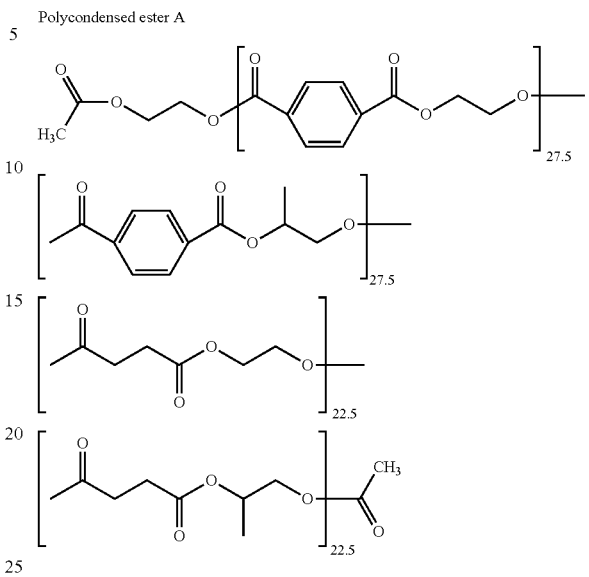

(Preparation of Mat Agent Solution 2)
The following composition was put into a disperser and dispersed to prepare a mat agent solution 2.

| Composition of Mat Agent Solution 2 | |
|---|---|
| Silica particles having a mean particle size of 20 nm (Aerosil R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution 1 | 10.3 mas. pts. |

(Preparation of Organic Acid Solution 3)
The following composition was put into a mixing tank and dissolved by stirring under heat to prepare an organic acid solution 3.

| Composition of Additive Solution 3 | |
|---|---|
| Poem K-37V (produced by Riken Vitamin Co., Ltd.) | 20.0 mas. pts. |
| Methylene chloride (first solvent) | 67.2 mas. pts. |
| Methanol (second solvent) | 10.0 mas. pts. |
| Cellulose acylate solution 1 | 12.8 mas. pts. |

1.3 Parts by mass of the matting agent solution 2 and 2.5 parts by mass of the organic acid solution 3 were mixed using an in-line mixer after filtering each solution, 96.2 parts by mass of Cellulose Acylate Solution 1 was further added and mixed using an in-line mixer to prepare the dope solution for support side skin layer 601.
<Preparation of Dope for Core Layer 601>
The cellulose acylate solution 1 was used as a dope for a core layer.
<Preparation of Dope for Air Side Skin Layer 601>
1.3 Parts by mass of the matting agent solution 2 and 98.7 parts by mass of cellulose acylate solution 1 were mixed using an in-line mixer to prepare the dope solution for air side skin layer 601.

(Casting)

The dope 601 for support-side surface layer, the dope 601 for substrate layer and the dope 601 for air-side surface layer were cast on a support, as laminated in that order. The formed web was peeled away from the band. The volatile remaining in the peeled film was 40% by mass of the solid content of the film. The peeled film was laterally stretched at a draw ratio of 30% using a tenter under the condition of 150° C., then unclipped, and dried at 135° C. for 20 minutes, thereby producing a polarizer protective film 601 in which the thickness after stretched of the substrate layer was 54 μm and that of the support-side surface layer and the air-side surface layer was 3 μm each. The composition is shown in the following Table 3.

Example 602 to 607, 611, 613, 615, 702 and 703, and Comparative Example 701 and 704

<Manufacturing Protective Film of Polarizer of Example 602 to 607, 611, 613, 615, 702 and 703, Comparative Example 701 and 704>

Protective film of polarizers of Example 602 to 607, 611, 613, 615, 702 and 703, Comparative Example 701 and 704 were manufactured in the same way as in Example 601 but changing the acyl substitution degree of cellulose acylate, the type and addition amount of the organic acid and film thickness as listed in the following Table 3.

In Table 3, the addition amount a of the organic acids express parts by mass based on 100 parts by mass of the cellulose acylate resin. The addition amount b of the organic acids express parts by mass based on 100 parts by mole of the cellulose acylate resin. Moreover, citrate acid used in Comparative Example 701 was used as example compound in JP-B 4,136,054, and this Comparative Example 701 was test for the effect of the above mentioned compound.

Example 608

{Manufacturing Protective Film of Polarizer}
<Preparation of Dope for Air Side Skin Layer 608>
(Preparation of Cellulose Acylate Solution)

The following composition was put into a mixing tank and stirred to dissolve the ingredients to prepare cellulose acylate solution 11.

| Composition of Cellulose Acylate Solution 11 | |
| --- | --- |
| Cellulose acylate (acetyl substitution degree is 2.85, degree of polymerization is 430) | 100.0 mas. pts. |
| Sucrose benzoate (Sigma-Aldrich Corporation) | 9.0 mas. pts. |
| Sucrose acetate isobutyrate (Eastman Chemical Company) | 3.0 mas. pts. |
| Methylene chloride (first solvent) | 316.0 mas. pts. |
| Methanol (second solvent) | 80.0 mas. pts. |
| n-Butanol (third solvent) | 4.0 mas. pts. |

(Preparation of Mat Agent Solution 12)

The following composition was put into a disperser and dispersed to prepare a mat agent solution 12.

| Composition of Mat Agent Solution 12 | |
| --- | --- |
| Silica particles having a mean particle size of 20 nm (Aerosil R972, by Nippon Aerosil) | 2.0 mas. pts. |
| Methylene chloride (first solvent) | 69.3 mas. pts. |
| Methanol (second solvent) | 17.5 mas. pts. |
| n-Butanol (third solvent) | 0.9 mas. pts. |
| Cellulose acylate solution 1 | 10.3 mas. pts. |

(Preparation of Organic Acid Solution 13)

The following composition was put into a mixing tank and dissolved by stirring under heat to prepare an organic acid solution 13.

| Composition of Additive Solution 13 | |
| --- | --- |
| Poem K-37V (produced by Riken Vitamin Co., Ltd.) | 20.0 mas. pts. |
| Methylene chloride (first solvent) | 61.0 mas. pts. |
| Methanol (second solvent) | 15.5 mas. pts. |
| Cellulose acylate solution 1 | 0.8 mas. pts. |

1.3 Parts by mass of the matting agent solution 12 and 2.5 parts by mass of the organic acid solution 13 were mixed using an in-line mixer after filtering each solution, 96.2 parts by mass of Cellulose Acylate Solution 11 was further added and mixed using an in-line mixer to prepare the dope solution for air side skin layer 608.

<Preparation of Dope for Core Layer 608>

The cellulose acylate solution 11 was used as a dope for a core layer.

<Preparation of Dope for Support Side Skin Layer 608>

1.3 Parts by mass of the matting agent solution 12 and 98.7 parts by mass of cellulose acylate solution 11 were mixed using an in-line mixer to prepare the dope solution for air side skin layer 608.

(Casting)

The dope 608 for support-side surface layer, the dope 608 for substrate layer and the dope 608 for air-side surface layer were cast on a drum support, as laminated in that order. The formed web was peeled away from the drum. The volatile remaining in the peeled film was 80% by mass of the solid content of the film. While held by a pin tenter, the released film was dried at 100° C. for 10 minutes, then removed from the pin tenter, dried at 140° C. for 20 minutes.

Example 609, 610, 612, 614 and 616, and Comparative Example 705 to 707

<Manufacturing Protective Film of Polarizer of Example 609, 610, 612, 614 and 616, and Comparative Example 705 to 707>

Protective film of polarizers of Example 609, 610, 612, 614 and 616, and Comparative Example 705 to 707 were manufactured in the same way as in Example 608 but changing the type and addition amount of the organic acid and film thickness as listed in the following Table 3.

In Table 3, the addition amount of the organic acids express parts by mass based on 100 parts by mass of the cellulose acylate resin.

(Determination of Distribution Ratio of Organic Acid in Film)

The distribution ratio A of the organic acid of formula (1) in the invention was determined according to the following method.

The film was cut obliquely at an angle of 1° relative to the film face, and the thus-formed, film cross section was mapped with a time-of-flight secondary ion mass spectrometer (TOF-SIMS). The mean value of the peak intensity of the molecule+$H^+$ ion at the part corresponding to a depth of at most 5 μm from the support-side surface of the film, and the mean value of the peak intensity of the molecule+$H^+$ ion at 5 μm from the air-side surface of the film were determined by positive measurement, and the distribution ratio A of the organic acid was computed according to the following formula.

Distribution Ratio $A$ of Organic Acid=(mean value of the peak intensity on the side having a higher organic acid concentration)/(mean value of the peak intensity on the side having a lower organic acid concentration).

(Measurement of Weight Average Molecular Weight of Cellulose Acylate)

The weight average molecular weight of the cellulose acylate films manufactured in Examples and Comparative Examples were measured via high performance liquid chromatography in the following condition.
Solvent: tetrahydrofuran (films of Example 601 to 607, 611, 613, 615, and Example 701 to 704) or methylene chloride (films of Example 608 to 610, 612, 614, 616, and Example 705 to 707)
Columns: SHODEX K806, K805, and K803G (produced by Showa Denko K. K., three columns were employed via connections)
Column temperature: 25° C.
Sample concentration: 0.1% by weight
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp.) was employed.

Further, the cellulose acylate film was cut into a piece of 3 cm×12 cm, and left under the condition at 80° C. and at a relative humidity of 90% for 150 hours, and the molecular weight distribution was determined according to the above-mentioned method. Mw change was computed according to the following formula.

Mw Change=(weight-average molecular weight of the cellulose acylate in the film left at 80° C. and at relative humidity of 90% for 150 hours)/(weight-average molecular weight of the cellulose acylate before aged)×100%.

<Saponification Treatment of Protective Film of Polarizer>

The protective film of polarizer 601 produced was dipped in a 2.3 mol/L aqueous solution of sodium hydroxide at 55° C. for 3 minutes. Next, the film was washed in a water washing bath at room temperature and then neutralized with 0.05 mol/L sulfuric acid at 30° C. Next, it was washed again in a water washing bath at room temperature and dried in a hot air stream at 100° C. Thus, the surface of the protective film of polarizer 601 was saponified.

<Production of Polarizer>

Iodine was adsorbed by the stretched polyvinyl alcohol film to prepare a polarizing element.

The saponificated protective film of polarizer of Example 601 was stuck to one surface of the polarizing element, using a polyvinyl alcohol adhesive. A commercial cellulose triacetate film (Fujitac TD80UF, by FUJIFILM Corporation) was saponified in the same method, and the saponificated cellulose triacetate film was stuck to the other side of the polarizing element, using a polyvinyl alcohol adhesive.

The films were so stuck to the polarizing element that the transmission axis of the polarizing element could be parallel to the slow axis of the protective film of polarizer produced in Example 601 and that the transmission axis of the polarizing element could be perpendicular to the slow axis of the commercial cellulose triacetate film.

Thus, the polarizer of Example 601 was manufactured.

{Saponification Treatment of Protective Film of Polarizer and Production of Polarizer}

Each protective film of polarizer of Example 602 to 616, 702 and 703 and Comparative Example 701 and 704 to 707 was saponificated and manufactured in the same way as in Example 601, and then the polarizer of each Examples and Comparative Examples was manufactured.

(Evaluation of Polarizer Durability)

A cross transmittance in the wavelength of 410 nm of each polarizer of Examples and Comparative Examples manufactured above was measured in the manner described in this invention:

Then, a cross transmittance of each polarizer was measured in the same manner described above after preserved under 60° C. and relative humidity 95% for 500 hours. The cross transmittance variation of the polarizer before and after the preservation was calculated and the result was shown in the following Table 3 as polarizer durability. In addition, the relative humidity under environment without humidity control was fall within the range of 0% to 20%.

(Evaluation of Peeling Aptitude)

Peeling aptitude of the polarizers of Examples and Comparative Examples manufactured were tested by the same way in Example 101. The results were shown in the following Table 3.

(Evaluation of SUS Erosion)

SUS erosion evaluations by organic acids of the polarizers of Examples and Comparative Examples manufactured were tested by the same way in Example 101. The results were shown in the following Table 3.

TABLE 3

| | Cellulose acetate | | | | | | Organic acid | | | | | | Average of all layers | | |
|---|---|---|---|---|---|---|---|---|---|---|---|---|---|---|---|
| | | | | | | | Support side skin layer | | Core layer | | Air side skin layer | | Average of additive amount of acid in all layers [mass. pts] | Average of additive amount of acid in all layers [mmol] | Distribution ratio A |
| | Acetyl substitution degree | Propionyl substitution degree | Total acyl substitution degree | Amount [mass.] pts.] | Type | Molecular weight | Dope for support side skin layer [mass. pts.] | Thickness [μm] | Dope for core layer [mass. pts.] | Thickness [μm] | Dope for air side skin layer [mass. pts.] | Thickness [μm] | | | |
| EX. 601 | 2.45 | 0 | 2.45 | 100 | A | 531 | 3.0 | 3.0 | 0 | 54 | 0 | 3.0 | 0.15 | 0.28 | 1.6 |
| EX. 602 | 2.45 | 0 | 2.45 | 100 | B | 463 | 6.0 | 3.0 | 0 | 54 | 0 | 3.0 | 0.30 | 0.65 | 1.4 |
| EX. 603 | 2.45 | 0 | 2.45 | 100 | C | 420 | 12.0 | 3.0 | 0 | 54 | 0 | 3.0 | 0.60 | 1.43 | 1.3 |
| EX. 604 | 2.45 | 0 | 2.45 | 100 | D | 392 | 15.0 | 3.0 | 0 | 54 | 0 | 3.0 | 0.75 | 1.91 | 1.5 |
| EX. 605 | 2.45 | 0 | 2.45 | 100 | E | 519 | 10.0 | 3.0 | 0 | 54 | 0 | 3.0 | 0.50 | 0.96 | 1.5 |
| EX. 606 | 2.45 | 0 | 2.45 | 100 | A | 531 | 9 | 3.0 | 0 | 54 | 0 | 3.0 | 0.45 | 0.85 | 1.3 |

TABLE 3-continued

| | | | | | | | | | | | | | | | |
|---|---|---|---|---|---|---|---|---|---|---|---|---|---|---|---|
| EX. 607 | 2.45 | 0 | 2.45 | 100 | D | 392 | 18 | 3.0 | 0 | 54 | 0 | 3.0 | 0.90 | 2.30 | 1.9 |
| EX. 611 | 2.45 | 0 | 2.45 | 100 | F | 336 | 6 | 3.0 | 0 | 54 | 0 | 3.0 | 0.30 | 0.89 | 1.4 |
| EX. 613 | 2.45 | 0 | 2.45 | 100 | G | 223 | 6 | 3.0 | 0 | 54 | 0 | 3.0 | 0.30 | 1.35 | 1.3 |
| EX. 615 | 2.45 | 0 | 2.45 | 100 | H | 301 | 6 | 3.0 | 0 | 54 | 0 | 3.0 | 0.30 | 1.00 | 1.5 |
| Comp. EX. 701 | 2.45 | 0 | 2.45 | 100 | Citric acid | 190 | 3.0 | 3.0 | 0 | 54 | 0 | 3.0 | 0.15 | 0.79 | 1.5 |
| Comp. EX. 702 | 2.45 | 0 | 2.45 | 100 | A | 531 | 3.0 | 3.0 | 3.0 | 54 | 3.0 | 3.0 | 3.0 | 3.0 | 1.1 |
| Comp. EX. 703 | 2.45 | 0 | 2.45 | 100 | A | 531 | 0.3 | 3.0 | 0.3 | 54 | 0.3 | 3.0 | 0.3 | 0.30 | 1.1 |
| Comp. EX. 704 | 2.45 | 0 | 2.45 | 100 | Nothing | — | 0 | 3.0 | 0 | 54 | 0 | 3.0 | 0 | 0 | — |
| EX. 608 | 2.85 | 0 | 2.85 | 100 | A | 531 | 0 | 5.0 | 0 | 35 | 6.0 | 20.0 | 2.0 | 0.30 | 2.0 |
| EX. 609 | 2.85 | 0 | 2.85 | 100 | A | 531 | 0 | 5.0 | 0 | 50 | 12 | 5 | 1.0 | 0.30 | 3.8 |
| EX. 610 | 2.85 | 0 | 2.85 | 100 | A | 531 | 0 | 5.0 | 0 | 50 | 24 | 5 | 2.0 | 0.30 | 4.2 |
| EX. 612 | 2.85 | 0 | 2.85 | 100 | F | 336 | 0 | 5.0 | 0 | 50 | 3 | 5 | 0.25 | 0.74 | 1.9 |
| EX. 614 | 2.85 | 0 | 2.85 | 100 | G | 223 | 0 | 5.0 | 0 | 50 | 3 | 5 | 0.25 | 1.12 | 2.0 |
| EX. 616 | 2.85 | 0 | 2.85 | 100 | H | 301 | 0 | 5.0 | 0 | 50 | 3 | 5 | 0.25 | 0.83 | 2.2 |
| Comp. EX. 705 | 2.85 | 0 | 2.85 | 100 | Nothing | — | 0 | 5.0 | 0 | 50 | 0 | 5.0 | 0 | 0 | — |
| Comp. EX. 706 | 2.85 | 0 | 2.85 | 100 | Citric acid | 190 | 0 | 5.0 | 0 | 50 | 2.0 | 5.0 | 0.17 | 0.9 | 1.0 |
| Comp. EX. 707 | 2.85 | 0 | 2.85 | 100 | Citric acid | 190 | 0 | 5.0 | 0 | 35 | 2.0 | 20.0 | 0.67 | 3.5 | 40 |

| | Film Properties | | Surface sticked to polarizer element | Polarizer durability: Cross transmittance variation [%] 60° C. rerative humidity 95% 300 hours | Change of Mw of resin [Mw after preserved/Mw before preserved ×100%] 80° C. rerative humidity 90% 150 hours | Peeling aptitude | SUS erosion |
|---|---|---|---|---|---|---|---|
| | Re [nm] | Rth [nm] | | | | | |
| EX. 601 | 53 | 123 | *Support side skin layer | 0.29 | 100 | 1 | 1 |
| EX. 602 | 53 | 123 | Support side skin layer | 0.20 | 100 | 1 | 1 |
| EX. 603 | 52 | 121 | Support side skin layer | 0.12 | 100 | 1 | 1 |
| EX. 604 | 51 | 120 | Support side skin layer | 0.11 | 99 | 1 | 1 |
| EX. 605 | 52 | 122 | Support side skin layer | 0.13 | 100 | 1 | 1 |
| EX. 606 | 52 | 122 | Support side skin layer | 0.14 | 100 | 1 | 1 |
| EX. 607 | 51 | 121 | Support side skin layer | 0.09 | 99 | 1 | 1 |
| EX. 611 | 51 | 121 | Support side skin layer | 0.19 | 100 | 1 | 1 |
| EX. 613 | 51 | 121 | Support side skin layer | 0.22 | 100 | 1 | 1 |
| EX. 615 | 50 | 120 | Support side skin layer | 0.25 | 99 | 1 | 1 |
| Comp. EX. 701 | 52 | 122 | Support side skin layer | 0.16 | 97 | 2 | 3 |
| Comp. EX. 702 | 50 | 120 | Support side skin layer | 0.15 | 99 | 1 | 1 |
| Comp. EX. 703 | 52 | 122 | Support side skin layer | 0.36 | 90 | 2 | 1 |
| Comp. EX. 704 | 53 | 123 | Support side skin layer | 0.39 | 100 | 3 | 2 |
| EX. 608 | 3 | 40 | Air side skin layer | 0.07 | 100 | 2 | 1 |
| EX. 609 | 3 | 41 | Air side skin layer | 0.05 | 100 | 2 | 1 |
| EX. 610 | 3 | 40 | Air side skin layer | 0.03 | 100 | 2 | 1 |
| EX. 612 | 4 | 43 | Air side skin layer | 0.08 | 100 | 2 | 1 |
| EX. 614 | 4 | 42 | Air side skin layer | 0.07 | 100 | 2 | 1 |
| EX. 616 | 3 | 42 | Air side skin layer | 0.08 | 100 | 2 | 1 |
| Comp. EX. 705 | 4 | 43 | Air side skin layer | 0.15 | 100 | 3 | 2 |
| Comp. EX. 706 | 4 | 42 | Air side skin layer | 0.13 | 99 | 2 | 3 |
| Comp. EX. 707 | 2 | 36 | Air side skin layer | 0.06 | 86 | 2 | 3 |

Organic acid A: Poem K-37V (produced by Riken Vitamin Co., Ltd.)

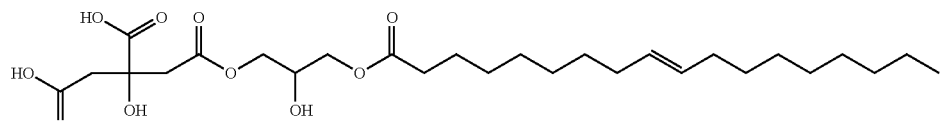

Organic acid B

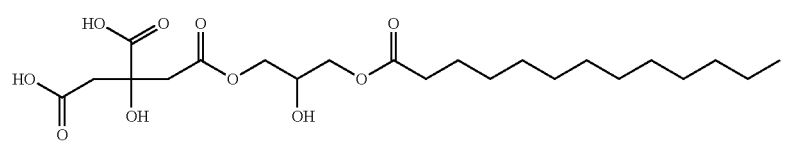

TABLE 3-continued

Organic acid C

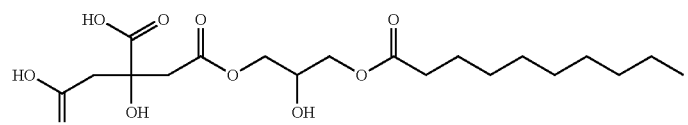

Organic acid D

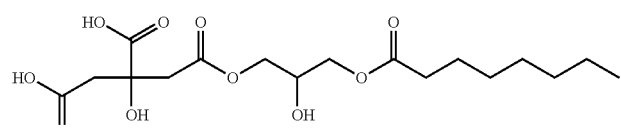

Organic acid E

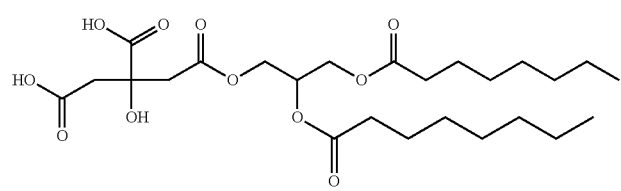

Organic acid F
N-(2,6-diethylphenylcarbamoylmethyl)iminodiacetic acid
Organic acid G
N-benzyliminodiacetic acid
Organic acid H
lauraminodiacetic acid From the results in the above Table 3, it is known that the polarizer comprising the polarizer protective film of the invention is favorable as causing little degradation of the polarizing element after aged in high-temperature high-humidity condition. It is also known that the resin film of the invention is favorable since the molecular weight of the resin hardly lowers even after stored in high-temperature high-humidity condition. In addition, the resin film containing a specific organic acid of the invention has good releasability and hardly corrodes SUS, and is therefore favorable from the viewpoint of producibility.

The present disclosure relates to the subject matter contained in Japanese Patent Application No. 055783/2010 filed on Mar. 12, 2010, Japanese Patent Application No. 194665/2010 filed on Aug. 31, 2010, and Japanese Patent Application No. 44043/2011 filed on Mar. 1, 2011, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A resin film comprising a resin and an organic acid monoglyceride represented by the following formula (1), wherein the content of the organic acid monoglyceride to the resin is from 0.1 to 20% by mass:

$$X\text{-}L\text{-}(R^1)_n$$

wherein:
X represents an acid group wherein the acid dissociation constant is 5.5 or less;
L represents a di- or more valent linking group;
$R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; and
n represents the number expressed by:

(the valent number of L)−1;

wherein the organic acid monoglyceride is one having a structure in which one of the three hydroxyl groups of glycerin forms an ester bond with a fatty acid, a second hydroxyl group is an unsubstituted hydroxyl group and the third hydroxyl group forms an ester bond with a polycarboxylic acid and has an acid group derived from the polycarboxylic acid.

2. The resin film according to claim 1, wherein the resin comprises cellulose acylate by amount of from 5 to 99% by mass.

3. The resin film according to claim 1, wherein the total acyl substitution degree of the cellulose acylate is at least 1.0 and less than 2.6.

4. The resin film according to claim 1, wherein the resin comprises acrylic resin in an amount of from 1 to 95% by mass.

5. The resin film according to claim 1, wherein the concentration of the organic acid monoglyceride in the area from the film surface to the 5 μm depth of one side of the film surface and the concentration of the organic acid monoglyceride in the area from the film surface to the 5 μm depth of the other side of the film surface satisfy the following inequality (2):

1.2≦(the concentration of the organic acid in the area from the film surface to the 5 μm depth of the film surface with high concentration of the organic acid)/(the concentration of the organic acid in the area from the film surface to the 5 μm depth of the film surface with low concentration of the organic acid)≦5.0.     Inequality (2)

6. A resin film produced by a method for producing a resin film comprising the steps of:
casting a dope having a resin and an organic acid monoglyceride represented by the following formula (1) on a metal support to prepare a dope film, wherein the ratio of the organic acid monoglyceride to the resin in the dope is from 0.1 to 20% by mass; and
peeling away the dope film from the metal support:

X-L-(R$^1$)$_n$     Formula (1)

wherein:
X represents an acid group wherein the acid dissociation constant is 5.5 or less;
L represents a di- or more valent linking group;
R$^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; and
n represents the number expressed by:

(the valent number of L)−1;

wherein the organic acid monoglyceride is one having a structure in which one of the three hydroxyl groups of glycerin forms an ester bond with a fatty acid, a second hydroxyl group is an unsubstituted hydroxyl group and the third hydroxyl group forms an ester bond with a polycarboxylic acid and has an acid group derived from the polycarboxylic acid.

7. A protective film of a polarizer comprising the resin film according to claim 1.

8. A polarizer comprising at least one sheet of the protective film according to claim 7.

9. A liquid crystal display device comprising at least one sheet of the protective film according to claim 7.

10. A liquid crystal display device comprising at least one polarizer according to claim 8.

11. The resin film according to claim 1, wherein the hydroxyl group ester-bonding to the fatty acid in the organic acid monoglyceride is in an asymmetric α-monoglyceride position, and the hydroxyl group ester-bonding to the polycarboxylic acid in the organic acid monoglyceride is also in an asymmetric α-monoglyceride position.

12. A resin film comprising a resin and an organic acid monoglyceride represented by the following formula (1), wherein the content of the organic acid monoglyceride to the resin is from 0.1 to 20% by mass:

X-L-(R$^1$)$_n$     Formula (1)

wherein:
X represents an acid group wherein the acid dissociation constant is 5.5 or less;
L represents a di- or more valent linking group;
R$^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; and
n represents the number expressed by:

(the valent number of L)−1;

wherein the organic acid monoglyceride is a polycarboxylic acid monoglyceride which has at least one unsubstituted carboxyl group of the polycarboxylic acid moiety and in which the other carboxyl groups are substituted with a monoglyceride.

13. The resin film according to claim 12, wherein the polycarboxylic acid monoglyceride is a carboxyl group-having organic acid monoglyceride in which one fatty acid molecule and one polyvalent carboxylic acid molecule bond to one glycerin molecule.

14. The resin film according to claim 12, wherein the polycarboxylic acid for the polycarboxylic acid monoglyceride is selected from the group consisting of succinic acid, citric acid, tartaric acid, diacetyltartaric acid, malic acid and adipic acid.

15. The resin film according to claim 13, wherein the fatty acid for the polycarboxylic acid monoglyceride is a saturated or unsaturated fatty acid having from 8 to 22 carbon atoms.

16. The resin film according to claim 15, wherein the fatty acid is selected from the group consisting of caprylic acid, capric acid, lauric acid, myristic acid, palmitic acid, stearic acid, behenic acid and oleic acid.

17. A resin film produced by a method for producing a resin film comprising the steps of:
casting a dope having a resin and an organic acid monoglyceride represented by the following formula (1) on a metal support to prepare a dope film, wherein the ratio of the organic acid monoglyceride to the resin in the dope is from 0.1 to 20% by mass; and
peeling away the dope film from the metal support:

X-L-(R$^1$)$_n$     Formula (1)

wherein:
X represents an acid group wherein the acid dissociation constant is 5.5 or less;
L represents a di- or more valent linking group;
R$^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; and
n represents the number expressed by:

(the valent number of L)−1;

wherein the organic acid monoglyceride is a polycarboxylic acid monoglyceride which has at least one unsubstituted carboxyl group of the polycarboxylic acid moiety and in which the other carboxyl groups are substituted with a monoglyceride.

18. The resin film according to claim 12, wherein the resin comprises cellulose acylate by amount of from 5 to 99% by mass.

19. The resin film according to claim 12, wherein the total acyl substitution degree of the cellulose acylate is at least 1.0 and less than 2.6.

20. The resin film according to claim 12, wherein the resin comprises acrylic resin in an amount of from 1 to 95% by mass.

21. The resin film according to claim 12, wherein the concentration of the organic acid monoglyceride in the area from the film surface to the 5 μm depth of one side of the film surface and the concentration of the organic acid monoglyceride in the area from the film surface to the 5 μm depth of the other side of the film surface satisfy the following inequality (2):

$$1.2 \leq \text{(the concentration of the organic acid in the area from the film surface to the 5 μm depth of the film surface with high concentration of the organic acid)}/\text{(the concentration of the organic acid in the area from the film surface to the 5 μm depth of the film surface with low concentration of the organic acid)} \leq 5.0. \quad \text{Inequality (2)}$$

22. A protective film of a polarizer comprising the resin film according to claim 12.

23. A polarizer comprising at least one sheet of the protective film according to claim 22.

24. A liquid crystal display device comprising at least one sheet of the protective film according to claim 22.

25. A liquid crystal display device comprising at least one polarizer according to claim 23.

* * * * *